United States Patent
Hawkins et al.

(10) Patent No.: US 8,407,166 B2
(45) Date of Patent: Mar. 26, 2013

(54) HIERARCHICAL TEMPORAL MEMORY SYSTEM WITH HIGHER-ORDER TEMPORAL POOLING CAPABILITY

(75) Inventors: Jeffrey C. Hawkins, Atherton, CA (US);
Dileep George, Menlo Park, CA (US);
Charles Curry, Fremont, CA (US);
Frank E. Astier, Mountain View, CA (US); Anosh Raj, Palo Alto, CA (US);
Robert G. Jaros, San Francisco, CA (US)

(73) Assignee: Numenta, Inc., Redwood City, CA (US)

( * ) Notice: Subject to any disclaimer, the term of this patent is extended or adjusted under 35 U.S.C. 154(b) by 757 days.

(21) Appl. No.: 12/483,642

(22) Filed: Jun. 12, 2009

(65) Prior Publication Data

US 2009/0313193 A1 Dec. 17, 2009

Related U.S. Application Data

(60) Provisional application No. 61/060,891, filed on Jun. 12, 2008.

(51) Int. Cl.
*G06F 15/18* (2006.01)
*G06F 17/10* (2006.01)
*G06F 17/16* (2006.01)

(52) U.S. Cl. ............... 706/13; 706/18; 706/21; 706/46
(58) Field of Classification Search ............... 706/13
See application file for complete search history.

(56) References Cited

U.S. PATENT DOCUMENTS

| | | |
|---|---|---|
| 4,766,534 A | 8/1988 | DeBenedictis |
| 4,845,744 A | 7/1989 | DeBenedictis |
| 5,255,348 A | 10/1993 | Nenov |
| 5,712,953 A | 1/1998 | Langs |
| 5,729,661 A | 3/1998 | Keeler et al. |
| 5,761,389 A | 6/1998 | Maeda et al. |
| 6,028,608 A | 2/2000 | Jenkins |
| 6,122,014 A | 9/2000 | Panusopone et al. |
| 6,144,711 A | 11/2000 | Raleigh et al. |

(Continued)

FOREIGN PATENT DOCUMENTS

| | | |
|---|---|---|
| EP | 1557990 A | 7/2005 |
| WO | WO 2006/063291 A | 6/2006 |

(Continued)

OTHER PUBLICATIONS

Numenta, Zeta1 Algorithms Reference Version 1.0, 2007.*

(Continued)

*Primary Examiner* — Jeffrey A Gaffin
*Assistant Examiner* — Nathan Brown, Jr.
(74) *Attorney, Agent, or Firm* — Fenwick & West LLP

(57) ABSTRACT

A temporal pooler for a Hierarchical Temporal Memory network is provided. The temporal pooler is capable of storing information about sequences of co-occurrences in a higher-order Markov chain by splitting a co-occurrence into a plurality of sub-occurrences. Each split sub-occurrence may be part of a distinct sequence of co-occurrences. The temporal pooler receives the probability of spatial co-occurrences in training patterns and tallies counts or frequency of transitions from one sub-occurrence to another sub-occurrence in a connectivity matrix. The connectivity matrix is then processed to generate temporal statistics data. The temporal statistics data is provided to an inference engine to perform inference or prediction on input patterns. By storing information related to a higher-order Markov model, the temporal statistics data more accurately reflects long temporal sequences of co-occurrences in the training patterns.

20 Claims, 13 Drawing Sheets

U.S. PATENT DOCUMENTS

| | | |
|---|---|---|
| 6,195,622 B1 | 2/2001 | Altschuler et al. |
| 6,400,996 B1 | 6/2002 | Hoffberg et al. |
| 6,468,069 B2 | 10/2002 | Lemelson et al. |
| 6,567,814 B1 | 5/2003 | Banker et al. |
| 6,615,211 B2 | 9/2003 | Beygelzimer et al. |
| 6,625,585 B1 | 9/2003 | MacCuish et al. |
| 6,714,941 B1 | 3/2004 | Lerman et al. |
| 6,751,343 B1 | 6/2004 | Ferrell et al. |
| 6,957,241 B2 | 10/2005 | George |
| 7,088,693 B2 | 8/2006 | George |
| 7,251,637 B1 | 7/2007 | Caid et al. |
| 7,613,675 B2 | 11/2009 | Hawkins et al. |
| 7,620,608 B2 | 11/2009 | Jaros et al. |
| 7,624,085 B2 | 11/2009 | Hawkins et al. |
| 7,676,458 B2 | 3/2010 | Aggarwal et al. |
| 7,739,208 B2 | 6/2010 | George et al. |
| 7,826,990 B2 | 11/2010 | Nasle et al. |
| 7,840,395 B2 | 11/2010 | Nasle et al. |
| 7,840,396 B2 | 11/2010 | Radibratovic et al. |
| 7,844,439 B2 | 11/2010 | Nasle et al. |
| 7,844,440 B2 | 11/2010 | Nasle et al. |
| 7,899,775 B2 | 3/2011 | George et al. |
| 7,904,412 B2 | 3/2011 | Saphir et al. |
| 7,937,342 B2 | 5/2011 | George et al. |
| 7,941,389 B2 | 5/2011 | Marianetti et al. |
| 7,941,392 B2 | 5/2011 | Saphir |
| 7,983,998 B2 | 7/2011 | George et al. |
| 8,037,010 B2 | 10/2011 | Jaros et al. |
| 8,103,603 B2 | 1/2012 | George et al. |
| 8,112,367 B2 | 2/2012 | George et al. |
| 8,121,961 B2 | 2/2012 | George et al. |
| 8,175,981 B2 | 5/2012 | Hawkins et al. |
| 8,175,984 B2 | 5/2012 | George |
| 8,175,985 B2 | 5/2012 | Sayfan et al. |
| 8,195,582 B2 | 6/2012 | Niemasik et al. |
| 8,219,507 B2 | 7/2012 | Jaros et al. |
| 8,285,667 B2 | 10/2012 | Jaros et al. |
| 8,290,886 B2 | 10/2012 | George et al. |
| 2002/0002688 A1 | 1/2002 | Gregg et al. |
| 2002/0038294 A1 | 3/2002 | Matsugu |
| 2002/0150044 A1 | 10/2002 | Wu et al. |
| 2002/0161736 A1 | 10/2002 | Beygelzimer et al. |
| 2003/0069002 A1 | 4/2003 | Hunter et al. |
| 2003/0105597 A1 | 6/2003 | Tsui et al. |
| 2003/0123732 A1 | 7/2003 | Miyazaki et al. |
| 2003/0167111 A1 | 9/2003 | Kipersztok et al. |
| 2004/0002838 A1 | 1/2004 | Oliver et al. |
| 2004/0015459 A1 | 1/2004 | Jaeger |
| 2004/0142325 A1 | 7/2004 | Mintz et al. |
| 2004/0148520 A1 | 7/2004 | Talpade et al. |
| 2004/0267395 A1 | 12/2004 | Discenzo et al. |
| 2005/0002572 A1 | 1/2005 | Saptharishi et al. |
| 2005/0028033 A1 | 2/2005 | Kipersztok et al. |
| 2005/0063565 A1 | 3/2005 | Nagaoka et al. |
| 2005/0190990 A1 | 9/2005 | Burt et al. |
| 2005/0203773 A1 | 9/2005 | Soto et al. |
| 2005/0222811 A1 | 10/2005 | Jakobson et al. |
| 2006/0093188 A1 | 5/2006 | Blake et al. |
| 2006/0098886 A1 | 5/2006 | De Haan |
| 2006/0161736 A1 | 7/2006 | Huang |
| 2006/0184462 A1 | 8/2006 | Hawkins |
| 2006/0212444 A1 | 9/2006 | Handman et al. |
| 2006/0235320 A1 | 10/2006 | Tan et al. |
| 2006/0248026 A1 | 11/2006 | Aoyama et al. |
| 2006/0248073 A1 | 11/2006 | Jones et al. |
| 2006/0253491 A1 | 11/2006 | Gokturk et al. |
| 2006/0259163 A1 | 11/2006 | Hsiung et al. |
| 2007/0005531 A1 | 1/2007 | George et al. |
| 2007/0019754 A1 | 1/2007 | Raleigh et al. |
| 2007/0192264 A1 | 8/2007 | Hawkins et al. |
| 2007/0192267 A1 | 8/2007 | Hawkins et al. |
| 2007/0192268 A1 | 8/2007 | Hawkins et al. |
| 2007/0192269 A1 | 8/2007 | Saphir et al. |
| 2007/0192270 A1 | 8/2007 | Hawkins et al. |
| 2007/0228703 A1 | 10/2007 | Breed |
| 2007/0276744 A1 | 11/2007 | Burke |
| 2007/0276774 A1 | 11/2007 | Ahmad et al. |
| 2008/0059389 A1 | 3/2008 | Jaros et al. |
| 2008/0140593 A1 | 6/2008 | George et al. |
| 2008/0183647 A1 | 7/2008 | Hawkins et al. |
| 2008/0201286 A1 | 8/2008 | Hawkins |
| 2008/0208783 A1 | 8/2008 | Jaros et al. |
| 2008/0208915 A1 | 8/2008 | George et al. |
| 2008/0208966 A1 | 8/2008 | Edwards et al. |
| 2009/0006289 A1 | 1/2009 | Jaros et al. |
| 2009/0116413 A1 | 5/2009 | George |
| 2009/0150311 A1 | 6/2009 | George |
| 2009/0240886 A1 | 9/2009 | Sayfan et al. |
| 2010/0049677 A1 | 2/2010 | Jaros et al. |
| 2010/0185567 A1 | 7/2010 | Niemaski et al. |
| 2010/0191684 A1 | 7/2010 | George |
| 2010/0207754 A1 | 8/2010 | Shostak et al. |
| 2011/0225108 A1 | 9/2011 | Hawkins et al. |
| 2011/0231351 A1 | 9/2011 | George et al. |
| 2012/0005134 A1 | 1/2012 | Jaros et al. |
| 2012/0166364 A1 | 6/2012 | Ahmad et al. |
| 2012/0197823 A1 | 8/2012 | Hawkins et al. |

FOREIGN PATENT DOCUMENTS

| | | |
|---|---|---|
| WO | WO 2008/067326 A | 6/2008 |
| WO | WO 2009/006231 A | 1/2009 |

OTHER PUBLICATIONS

Adelson, E.H. et al., "The Perception of Shading and Reflectance," Perception as Bayesian Inference, Knill, D.C. et al., ed., 1996, pp. 409-423, Cambridge University Press, UK.

Agrawal, R. et al., "Mining Sequential Patterns," IEEE, 1995, pp. 3-14.

Ahmad, S., "NuPIC Jumpstart—Part II," Numenta®, May 2008, Numenta HTM Workshop, Jun. 23-24, 2008, SRI Campus, Menlo Park, CA, 34 pages.

Ahmad, S. et al., "PowerNuPIC," Numenta®, Jun. 2008, Numenta HTM Workshop, Jun. 23-24, 2008, SRI Campus, Menlo Park, CA, 57 pages.

Archive of "Numenta Platform for Intelligent Computing Programmer's Guide," Numenta, Mar. 7, 2007, pp. 1-186, www.numenta.com, [Online] Archived by http://archive.org on Mar. 19, 2007; Retrieved on Aug. 13, 2008] Retrieved from the Internet<URL: http://web.archive.org/web/20070319232606/http://www.numenta.com/for-developers/software/pdf/nupic_prog_guide.pdf>.

Becerra, J.A. et al., "Multimodule Artificial Neural Network Architectures for Autonomous Robot Control Through Behavior Modulation," IWANN 2003, LNCS, J. Mira (Ed.), pp. 169-176, vol. 2687, Springer-Verlag.

Biancaniello, P. et al., Multimodal Pattern Recognition with Hierarchical Temporal Memory (MPR), Lockheed Martin Brain-Inspired Computing Research Overview, Numenta HTM Workshop, Jun. 2008, 12 pages.

Bobier, B., "Content-Based Image Retrieval Using Hierarchical Temporal Memory," Numenta HTM Workshop, Jun. 23-24, 2008, SRI Campus, Menlo Park, CA, 7 pages.

Cormack, G.V. et al., "Data Compression Using Dynamic Markov Modelling," The Computer Journal, 1987, pp. 541-550, vol. 30, No. 6.

Csapo, A.B. et al., "Object Categorization Using VFA-Generated Nodemaps and Hierarchical Temporal Memories," IEEE International Conference on Computational Cybernetics, IEEE, Oct. 7, 2007, pp. 257-262.

Curry, C. et al., "Speech Processing with HTM," Numenta®, Jun. 2008, Numenta HTM Workshop, Jun. 23-24, 2008, SRI Campus, Menlo Park, CA, 57 pages.

Demeris, Y. et al., "From Motor Babbling to Hierarchical Learning by Imitation: A Robot Developmental Pathway," Proceedings of the Fifth International Workshop on Epigenetic Robotics: Modeling Cognitive Development in Robotic Systems, 2005, pp. 31-37.

Ding, C.H.Q., "Cluster Merging and Splitting in Hierarchical Clustering Algorithms," Proceedings of the 2002 IEEE International Conference on Data Mining (ICDM 2002), Dec. 9, 2002, pp. 139-146.

Dubinsky, D., "Numenta Business Strategy," Numenta®, Jun. 2008, Numenta HTM Workshop, Jun. 23-24, 2008, SRI Campus, Menlo Park, CA, 15 pages.

"EDSA Project Information," Numenta®, Apr. 2008, Numenta HTM Workshop, Jun. 23-24, 2008, SRI Campus, Menlo Park, CA, 4 pages.
Eswaran, K., "Numenta Lightning Talk on Dimension Reduction and Unsupervised Learning," Numenta HTM Workshop, Jun. 23-24, 2008, SRI Campus, Menlo Park, CA, 30 pages.
European Examination Report, European Application No. 07750385.2, Apr. 21, 2009, 8 pages.
European Examination Report, European Application No. 05853611.1, Jun. 23, 2008, 4 pages.
Felleman, D.J. et al., "Distributed Hierarchical Processing in the Primate Cerebral Cortex," Cerebral Cortex, Jan./Feb. 1991, pp. 1-47, vol. 1.
Fine, S. et al., "The Hierarchical Hidden Markov Model: Analysis and Applications," Machine Learning, 1998, pp. 41-62, vol. 32, Kluwer Academic Publishers, Boston.
Finley, M., "Exploration of Motion Capture," Qualia Labs, Jun. 24, 2008, Numenta HTM Workshop, Jun. 23-24, 2008, SRI Campus, Menlo Park, CA, 36 pages.
Foldiak, P., "Learning Invariance from Transformation Sequences," Neural Computation, 1991, pp. 194-200, vol. 3, No. 2.
Fukushima, K., "Neocognitron: A Self-Organizing Neural Network Model for a Mechanism of Pattern Recognition Unaffected by Shift in Position," Biol. Cybernetics, 1980, pp. 193-202, vol. 36.
George, D. et al., "A Hierarchical Bayesian Model of Invariant Pattern Recognition in the Visual Cortex," Mar. 2005.
George, D. et al., "Invariant Pattern Recognition Using Bayesian Inference on Hierarchical Sequences," Technical Report, Sep. 17, 2004, pp. 1-8.
George, D. et al., "Invariant Pattern Recognition Using Bayesian Inference on Hierarchical Sequences," Oct. 2004.
George, D. et al., "A Hierarchical Bayesian Model of Invariant Pattern Recognition in the Visual Cortext," Proceedings, 2005 IEEE International Joint Conference on Neural Networks, Jul. 31-Aug. 4, 2005, pp. 1812-1817, vol. 3.
George, D. et al., "The HTM Learning Algorithm," [Online] [Retrieved on Jan. 1, 2009] Retrieved from the Internet<URL:http://www.numenta.com/for-developers/education/Numenta_HTM_Learning_Algos.pdf>.
Gottschalk, K. et al., "Introduction to Web Services Architecture," IBM Systems Journal, 2002, pp. 170-177, vol. 41, No. 2.
Guinea, D. et al., "Robot Learning to Walk: An Architectural Problem for Intelligent Controllers," Proceedings of the 1993 International Symposium on Intelligent Control, Chicago, IL, IEEE, Aug. 1993, pp. 493-498.
Guo, C-E. et al., "Modeling Visual Patterns by Integrating Descriptive and Generative Methods," International Journal of Computer Vision, May 29, 2003, 28 pages, vol. 53, No. 1.
Haitani, R. et al., "Vitamin D Toolkit, Introduction," Jun. 24, 2008, Numenta HTM Workshop, Jun. 23-24, 2008, SRI Campus, Menlo Park, CA, 11 pages.
Han, K. et al., "Automated Robot Behavior Recognition Applied to Robotic Soccer," In Proceedings of the IJCAI-99 Workshop on Team Behaviors and Plan Recognition, 1999, 6 pages.
Hasegawa, Y. et al., "Learning Method for Hierarchical Behavior Controller," Proceedings of the 1999 IEEE International Conference on Robotics & Automation, May 1999, pp. 2799-2804.
Hawkins, J. et al., "Hierarchical Temporal Memory Concepts, Theory and Terminology," Numenta, Jan. 27, 2007, pp. 1-20.
Hawkins, J. et al., "Hierarchical Temporal Memory Concepts, Theory and Terminology," Numenta, Mar. 27, 2007 [Online] [Retrieved on Oct. 7, 2008] Retrieved from the Internet<URL:http://www.numenta.com/Numenta_HTM_Concepts.pdf>.
Hawkins, J. et al., "Hierarchical Temporal Memory Concepts, Theory and Terminology," Numenta, May 10, 2006 [Online] [Retrieved on Jul. 16, 2008] Retrieved from the Internet<URL:http://www.neurosecurity.com/whitepapers/Numenta_HTM_Concepts.pdf>.
Hawkins, J. et al., "On Intelligence," Sep. 2004, Times Books, Henry Holt and Company, New York, NY 10011.
Hawkins, J. et al., "Sequence Memory for Prediction, Inference and Behaviour," Philosophical Transactions of the Royal Society B, Mar. 31, 2009, pp. 1203-1209, vol. 364.

Hawkins, J., "Why Can't a Computer Be More Like a Brain?" IEEE Spectrum, Apr. 1, 2007, pp. 21-26, vol. 44, No. 4, IEEE Inc., New York, US.
Hernandez-Gardiol, N. et al., "Hierarchical Memory-Based Reinforcement Learning," Proceedings of Neural Information Processing Systems, 2001, 7 pages.
Hinton, G.E. et al., "The "Wake-Sleep" Algorithm for Unsupervised Neural Networks," Science, May 26, 1995, pp. 1158-116, vol. 268.
Hoey, J., "Hierarchical Unsupervised Learning of Facial Expression Categories," 2001, IEEE, 0-7695-1293-3, pp. 99-106.
"HTM Algorithms," Numenta®, Jun. 2008, Numenta HTM Workshop, Jun. 23-24, 2008, SRI Campus, Menlo Park, CA, 67 pages.
"HTM Optimized Drug Therapy," SDSytem24.com, Numenta HTM Workshop, Jun. 23-24, 2008, SRI Campus, Menlo Park, CA, 7 pages.
"HTM Workshop, Jumpstart," Numenta®, Jun. 2008, Numenta HTM Workshop, Jun. 23-24, 2008, SRI Campus, Menlo Park, CA, 86 pages.
Hyvarinen, A. et al., "Bubbles: A Unifying Framework for Low-Level Statistical Properties of Natural Image Sequences," J. Opt. Soc. Am. A., 2003, pp. 1237-1252, vol. 20, No. 7.
International Search Report and Written Opinion, International Application No. PCT/US07/85661, Jun. 13, 2008, 7 pages.
International Search Report and Written Opinion, International Application No. PCT/US08/55389, Jul. 25, 2008, 8 pages.
International Search Report and Written Opinion, International Application No. PCT/US08/55352, Aug. 1, 2008, 8 pages.
International Search Report and Written Opinion, International Application No. PCT/US2008/054631, Aug. 18, 2008, 14 pages.
International Search Report and Written Opinion, International Application No. PCT/US2008/068435, Oct. 31, 2008, 14 pages.
International Search Report and Written Opinion, International Application No. PCT/US2009/035193, Apr. 22, 2009, 14 pages.
International Search Report and Written Opinion, PCT/US2007/003544, Jun. 16, 2008, 14 pages.
International Search Report & Written Opinion, PCT/US2005/044729, May 14, 2007, 14 pages.
International Search Report and Written Opinion, PCT/US2009/047250, Sep. 25, 2009, 13 pages.
Isard, M. et al., "ICONDENSATION: Unifying Low-Level and High-Level Tracking in a Stochastic Framework," Lecture Notes in Computer Science 1406, Burkhardt, H. et al., ed., 1998, pp. 893-908, Springer-Verlag, Berlin.
Kuenzer, A. et al., "An Empirical Study of Dynamic Bayesian Networks for User Modeling," Proc. of the UM 2001 Workshop on Machine Learning, pages.
Lee, T.S. et al., "Hierarchical Bayesian Inference in the Visual Cortex," J. Opt. Soc. Am. A. Opt. Image. Sci. Vis., Jul. 2003, pp. 1434-1448, vol. 20, No. 7.
Lenser, S. et al., "A Modular Hierarchical Behavior-Based Architecture," RoboCup 2001, LNAI 2377, 2002, Birk, A. et al, (Eds.), pp. 423-428, Springer-Verlag, Berlin, Heidelberg.
Levinson, S. et al., "Automatic Language Acquisition for a Mobile Robot," Feb. 2005, Numenta HTM Workshop, Jun. 23-24, 2008, SRI Campus, Menlo Park, CA, 27 pages.
Lewicki, M.S. et al., "Bayesian Unsupervised Learning of Higher Order Structure," Moser, M.C. et al., ed., Proceedings of the 1996 Conference in Advances in Neural Information Processing Systems 9, 1997, pp. 529-535.
McDowell, C. et al., "SlugGo, a Computer Go Program," Numenta HTM Workshop, Jun. 23-24, 2008, SRI Campus, Menlo Park, CA, 18 pages.
Murphy, K. et al., "Using the Forest to See the Trees: A Graphical Model Relating Features, Objects and Scenes," Advances in Neural Processing System, 2004, vol. 16.
Murray, S.O. et al., "Shaper Perception Reduces Activity in Human Primary Visual Cortex," Proceedings of the Nat. Acad. of Sciences of the USA, Nov. 2002, pp. 15164-151169, vol. 99, No. 23.
"Numenta Node Algorithms Guide NuPIC 1.6," Numenta, Jun. 13, 2008, pp. 1-6.
"Numenta Node Algorithms Guide NuPIC 1.6," Numenta, Jul. 22, 2008, pp. 1-7.

Olshausen, B.A. et al., "A Neurobiological Model of Visual Attention and Invariant Pattern Recognition Based on Dynamic Routing Information," Jnl. of Neuroscience, Nov. 1993.

Pearl, J., "Probabilistic Reasoning in Intelligent Systems: Networks of Plausible Inference," 1988, pp. 143-223, Morgan Kaufmann Publishers, Inc.

"Problem Solving with HTMs," Numenta®, Jun. 2008, Numenta HTM Workshop, Jun. 23-24, 2008, SRI Campus, Menlo Park, CA, 23 pages.

Riesenhuber, M. et al., "Hierarchical Models of Object Recognition in Cortex," Nature Neuroscience, Nov. 1999, pp. 1019-1025, vol. 2, No. 11.

Ross, L., "Discovering and Using Patterns in Plant Floor Data," Numenta HTM Workshop, Jun. 23-24, 2008, SRI Campus, Menlo Park, CA, 12 pages.

Saphir, B., "Power NuPIC Part II, How to Create a New Node Type," Numenta®, Jun. 2008, Numenta HTM Workshop, Jun. 23-24, 2008, SRI Campus, Menlo Park, CA, 32 pages.

Sinha, P. et al., "Recovering Reflectance and Illumination in a World of Painted Polyhedra," Fourth International Conference on Computer Vision, Berlin, May 11-14, 1993, pp. 156-163, IEEE Computer Society Press, Los Alamitos, CA.

Stringer, S.M. et al., "Invariant Object Recognition in the Visual System with Novel Views of 3D Objects," Neural Computation, Nov. 2002, pp. 2585-2596, vol. 14, No. 11.

Sudderth, E.B. et al., "Nonparametric Belief Propagation and Facial Appearance Estimation," AI Memo 2002-020, Dec. 2002, pp. 1-10, Artificial Intelligence Laboratory, Massachusetts Institute of Technology, Cambridge, MA.

Thomson, A.M. et al., "Interlaminar Connections in the Neocortex," Cerebral Cortex, 2003, pp. 5-14, vol. 13, No. 1.

Tsukada, M, "A Theoretical Model of the Hippocampal-Cortical Memory System Motivated by Physiological Functions in the Hippocampus", Proceedings of the 1993 International Joint Conference on Neural Networks, Oct. 25, 1993, pp. 1120-1123, vol. 2, Japan.

U.S. Office Action, U.S. Appl. No. 11/622,456, Mar. 20, 2009, 9 pages.

U.S. Office Action, U.S. Appl. No. 11/622,456, Nov. 6, 2008, 7 pages.

U.S. Office Action, U.S. Appl. No. 11/622,456, May 7, 2008, 14 pages.

U.S. Office Action, U.S. Appl. No. 11/622,454, Mar. 30, 2009, 11 pages.

U.S. Office Action, U.S. Appl. No. 11/622,454, Jun. 3, 2008, 13 pages.

U.S. Office Action, U.S. Appl. No. 11/622,457, Apr. 21, 2009, 6 pages.

U.S. Office Action, U.S. Appl. No. 11/622,457, Nov. 20, 2008, 8 pages.

U.S. Office Action, U.S. Appl. No. 11/622,457, May 6, 2008, 14 pages.

U.S. Office Action, U.S. Appl. No. 11/622,457, Aug. 24, 2007, 10 pages.

U.S. Office Action, U.S. Appl. No. 11/147,069, Jul. 29, 2009, 43 pages.

U.S. Office Action, U.S. Appl. No. 11/147,069, Jan. 9, 2009, 38 pages.

U.S. Office Action, U.S. Appl. No. 11/147,069, May 15, 2008, 37 pages.

U.S. Office Action, U.S. Appl. No. 11/147,069, Oct. 30, 2007, 34 pages.

U.S. Office Action, U.S. Appl. No. 11/147,069, May 29, 2007, 36 pages.

U.S. Office Action, U.S. Appl. No. 11/147,069, Jan. 9, 2007, 27 pages.

Van Essen, D.C. et al., "Information Processing Strategies and Pathways in the Primate Visual System," An Introduction to Neural and Electronic Networks, 1995, $2^{nd}$ ed.

Vaught, T.N., "Software Design in Scientific Computing," Jun. 23, 2008, Numenta HTM Workshop, Jun. 23-24, 2008, SRI Campus, Menlo Park, CA, 32 pages.

"Vision Framework," Numenta®, Jun. 2008, Numenta HTM Workshop, Jun. 23-24, 2008, SRI Campus, Menlo Park, CA, 36 pages.

Vlajic, N. et al., "Vector Quantization of Images Using Modified Adaptive Resonance Algorithm for Hierarchical Clustering", IEEE Transactions on Neural Networks, Sep. 2001, pp. 1147-1162, vol. 12, No. 5.

Wiskott, L. et al., "Slow Feature Analysis: Unsupervised Learning of Invariances," Neural Computation, 2002, pp. 715-770, vol. 14, No. 4.

Yedidia, J.S. et al., "Understanding Belief Propagation and its Generalizations," Joint Conference on Artificial Intelligence (IJCAI 2001), Seattle, WA, Aug. 4-10, 2001, 35 pages.

Zemel, R.S., "Cortical Belief Networks," Computational Models for Neuroscience, Hecht-Nielsen, R. et al., ed., 2003, pp. 267-287, Springer-Verlag, New York.

"Zeta1 Algorithms Reference, Version 1.0," Numenta Inc., Mar. 1, 2007, pp. 1-36.

"Zeta1 Algorithms Reference, Version 1.2," Numenta Inc., Jun. 8, 2007, pp. 1-38.

"Zeta1 Algorithms Reference, Version 1.3," Numenta Inc., Aug. 22, 2007, pp. 1-41.

"Zeta1 Algorithms Reference, Version 1.5," Numenta Inc., Aug. 24, 2007, pp. 1-45.

Dean, T., "Learning Invariant Features Using Inertial Priors," *Annals of Mathematics and Artificial Intelligence*, 2006, pp. 223-250, vol. 47.

Colombe, J., "A Survey of Recent Developments in Theoretical Neuroscience and Machine Vision," *Proceedings of the IEEE Applied Imagery Pattern Recognition Workshop*, 2003, nine pages.

Lo, J. "Unsupervised Hebbian Learning by Recurrent Multilayer Neural Networks for Temporal Hierarchical Pattern Recognition," *Information Sciences and Systems $44^{th}$ Annual Conference on Digital Object Identifier*, 2010, pp. 1-6.

Mannes, C., "A Neural Network Model of Spatio-Temporal Pattern Recognition, Recall and Timing," Technical Report CAS/CNS-92-013, Feb. 1992, Department of Cognitive and Neural Systems, Boston University, USA, seven pages.

Nair, D. et al., "Bayesian Recognition of Targets by Parts in Second Generation Forward Looking Infrared Images," *Image and Vision Computing*, 2000, pp. 849-864, vol. 18.

Namphol, A. et al., "Image Compression with a Hierarchical Neural Network," *IEEE transactions on Aerospace and Electronic Systems*, Jan. 1996, pp. 326-338, vol. 32, No. 1.

Naphade, M. et al., "A Probabilistic Framework for Semantic Video Indexing, Filtering, and Retrieval," *IEEE Transactions on Multimedia*, Mar. 2001, pp. 141-151, vol. 3, No. 1.

Rao, R. et al., "Predictive Coding in the Visual Cortex: A Functional Interpretation of Some Extra-classical Receptive-field Effects," *Nature Neuroscience*, Jan. 1999, pp. 79-87, vol. 2, No. 1.

Spence, C. et al., "Varying Complexity in Tree-Structured Image Distribution Models," *IEEE Transactions on Image Processing*, Feb. 2006, pp. 319-330, vol. 15, No. 2.

Starzyk, J.A. et al., "Spatio-Temporal Memories for Machine Learning: A Long-Term Memory Organization," *IEEE Transactions on Neural Networks*, May 2009, pp. 768-780, vol. 20, No. 5.

Weiss, R. et al., "HyPursuit: A Hierarchical Network Search Engine that Exploits Content-Link Hypertext Clustering," *Proceedings of the Seventh Annual ACM Conference on Hypertext*, Mar. 16-20, 1996, pp. 180-193, Washington, D.C. USA.

Dimitrova, N. et al., "Motion Recovery for Video Content Classification," ACM Transactions on Information Systems, Oct. 1995, pp. 408-439, vol. 13, No. 4.

Dolin, R. et al., "Scalable Collection Summarization and Selection," Association for Computing Machinery, 1999, pp. 49-58.

Guerrier, P., "A Generic Architecture for On-Chip Packet-Switched Interconnections," Association for Computing Machinery, 2000, pp. 250-256.

Kim, J. et al., "Hierarchical Distributed Genetic Algorithms: A Fuzzy Logic Controller Design Application," IEEE Expert, Jun. 1996, pp. 76-84.

Mishkin, M. et al., "Hierarchical Organization of Cognitive Memory," Phil. Trans. R. Soc. B., 1997, pp. 1461-1467, London.

Park, S. et al., "Recognition of Two-person Interactions Using a Hierarchical Bayesian Network," ACM SIGMM International Workshop on Video Surveillance (IWVS) 2003, pp. 65-76, Berkeley, USA.

Poppel, E., "A Hierarchical Model of Temporal Perception," Trends in Cognitive Sciences, May 1997, pp. 56-61, vol. 1, No. 2.
Tsinarakis, G.J. et al. "Modular Petri Net Based Modeling, Analysis and Synthesis of Dedicated Production Systems," Proceedings of the 2003 IEEE International Conference on Robotics and Automation, Sep. 14-19, 2003, pp. 3559-3564, Taipei, Taiwan.
Tsinarakis, G.J. et al. "Modular Petri Net Based Modeling, Analysis, Synthesis and Performance Evaluation of Random Topology Dedicated Production Systems," Journal of Intelligent Manufacturing, 2005, vol. 16, pp. 67-92.
United States Office Action, U.S. Appl. No. 11/680,197, Mar. 23, 2010, twelve pages.
United States Office Action, U.S. Appl. No. 11/713,157, Mar. 31, 2010, 14 pages.
United States Office Action, U.S. Appl. No. 11/622,458, Apr. 1, 2010, 16 pages.
United States Office Action, U.S. Appl. No. 11/622,455, Apr. 21, 2010, 12 pages.
Wu, G. et al., "Multi-camera Spatio-temporal Fusion and Biased Sequence-data Learning for Security Surveillance," Association for Computing Machinery, 2003, pp. 528-538.
European Patent Office Communication, European Patent Application No. 07750385.2, Dec. 6, 2010, eight pages.
European Patent Office Examination Report, European Patent Application No. 08796030.8, Dec. 6, 2010, seven pages.
Lim, K. et al., "Estimation of Occlusion and Dense Motion Fields in a Bidirectional Bayesian Framework," *IEEE Transactions on Pattern Analysis and Machine Intelligence*, May 2002, pp. 712-718, vol. 24, No. 5.
United States Office Action, U.S. Appl. No. 11/680,197, Sep. 14, 2010, seventeen pages.
U.S. Appl. No. 13/333,865, filed Dec. 21, 2011.
Rojas, R., "Neural Networks: A Systematic Introduction," 1996, pp. 20-21, 110-112 and 311-319.
U.S. Patent Office, Final Office Action, U.S. Appl. No. 13/227,355, Dec. 19, 2012, twenty-five pages.
U.S. Patent Office, Non-final Office Action, U.S. Appl. No. 12/052,580, Dec. 21, 2012, twenty-three pages.
Bryhni et al., "A Comparison of Load Balancing Ttechniques for Scalable Web Servers," IEEE Network, Jul./Aug. 2000, pp. 58-64.
Ceisel, A. et al., "Using HTM Networks to Decode Neural Signals from the Motor Cortex: A Novel Approach to Brain-Computer Interface Control," Illinois Institute of Technology, Numenta HTM Workshop, 2009, four pages.
Chapela, V., "Preventing Financial Fraud," Smart Security Services, Numenta HTM Workshop, 2009, forty pages.
Chinese Office Action, Chinese Application No. 200780007274.1m Jun. 24, 2011, five pages.
Chinese Office Action, Chinese Application No. 200580042258.7, Jul. 10, 2009, twelve pages.
Dudgeon, M. et al., "Evolved HTM Preprocessing," Qualia Labs, Jun. 25, 2009, nine pages.
Eastman, K. "HTM's & Airline Passenger Behavior: Prediction and Inference Model," Numenta HTM Workshop, 2009, ten pages.
Farahmand, N. et al., "Online Temporal Pattern Learning," *Proceedings of the International Joint Conference on Neural Networks*, Jun. 14-19, 2009, pp. 797-802, Atlanta, GA, USA.
Garalevicius, S., "Memory-Prediction Framework for Pattern Recognition: Performance and Suitability of the Bayesian Model of Visual Cortex," *American Association of Artificial Intelligence*, 2007, six pages.
George, D. "Thesis: How the Brain Might Work," Dept. of Electrical Engineering and the Committee on Graduate Studies of Stanford University, Jun. 2008, one-hundred ninety-one pages.
George, D. et al., "Towards a Mathematical Theory of Cortical Micro-circuits," *PLoS Computational Biology*, Oct. 2009, vol. 5, Issue 10, twenty-six pages.
Haitani, R., "Smart Video: A Disruptive Market Opportunity for HTM," Numenta HTM Workshop, 2009, twelve pages.
Hartung, J. et al., "Presentation: Support for the Use of Hierarchical Temporal Memory Systems in Automated Design Evaluation: A First Experiment," Numenta HTM Workshop, 2009, thirty-one pages.

Hartung, J. et al., "Support for the Use of Hierarchical Temporal Memory Systems in Automated Design Evaluation: A First Experiment," *Proceedings of the ASME 2009 Int'l. Design Engineering Technical Conferences & Computers and Information in Engineering Conference*, Aug. 30-Sep. 2, 2009, ten pages, San Diego, CA, USA.
Hawkins, J. "Hierarchical Temporal Memory: History-Progress-Today-Tomorrow," HTM Workshop, Jun. 2009, twenty-four pages.
Hawkins, J. "Prediction Toolkit Overview," Numenta HTM Workshop, 2009, four pages.
Hawkins, J. et al., "Hierarchical Temporal Memory, Concepts, Theory, and Terminology," Numenta, May 10, 2006, pp. 1-19.
Hawkins, J. et al., "Hierarchical Temporal Memory: Concepts, Theory and Terminology," Numenta, Inc., Mar. 27, 2007, 20 pages. [Online] [Retrieved on Sep. 22, 2011] Retrieved from the Internet<URL:http://www.numenta.com/htm-overview/education/Numenta_HTM_Concepts.pdf.>.
Majure, L., "Unsupervised Phoneme Acquisition Using HTM," Jun. 25, 2009, eight pages.
Mari, J.-F. et al., "Temporal and Spatial Data Mining with Second-Order Hidden Markov Models," *Soft Computing—A Fusion of Foundations, Methodologies and Applications*, 2006, pp. 406-414, vol. 10, No. 5.
Miller, J. W. et al., "Biomimetic Sensory Abstraction Using Hierarchical Quilted Self-Organizing Maps," *Society of Photo-Optical Instrumentation Engineers*, 2006, eleven pages.
Mitrovic, A., "An Intelligent SQL Tutor on the Web," International Journal of Artificial Intelligence in Education, 2003, pp. 171-195, vol. 13.
Muckli, L., "Predictive Coding in Apparent Motion," University of Glasgow, Numenta HTM Workshop, Jun. 25, 2009, twelve pages.
Niemasik, J. "Vision Toolkit," Numenta HTM Workshop, 2009, twenty-eight pages.
Numenta, Inc., "Business Strategy," Numenta HTM Workshop, 2009, fifteen pages.
Numenta, Inc., "Hierarchical Temporal Memory including HTM Cortical Learning Algorithms, Version 0.2.1," Sep. 12, 2011, sixty-eight pages. [Online] [Retrieved Sep. 22, 2011] Retrieved from the Internet <URL:http://www.numenta.com/htm-overview/education/HTM_CorticalLearningAlgorithms.pdf.>.
Numenta, Inc., "Hierarchical Temporal Memory: Comparison with Existing Models, Version 1.01," Mar. 1, 2007, four pages.
Numenta, Inc., "HTM Algorithms," Jun. 2008, Numenta HTM Workshop, Jun. 23-24, 2008, SRI Campus, Menlo Park, CA, sixty-seven pages.
Numenta, Inc., "HTM Workshop, Jumpstart," Jun. 2008, Numenta HTM Workshop, Jun. 23-24, 2008, SRI Campus, Menlo Park, CA, eighty-six pages.
Numenta, Inc., "Numenta Platform for Intelligent Computing: Programmer's Guide Version 1.0," Mar. 2007, seventy-seven pages.
Numenta, Inc., "NuPIC Update," Numenta HTM Workshop, 2009, twenty-four pages.
Numenta, Inc., "Problem Solving with HTMs," Jun. 2008, Numenta HTM Workshop, Jun. 23-24, 2008, SRI Campus, Menlo Park, CA, twenty-three pages.
Numenta, Inc., "Prototype to Demonstrate Automated Insect Detection and Discrimination," Numenta HTM Workshop, 2009, four pages.
Numenta, Inc., "Smart Music: Combining Musical Expectations with Algorithmic Composition," Numenta HTM Workshop, 2009, seven pages.
Numenta, Inc., "Technical Keynote," Numenta HTM Workshop, 2009, seventy-two pages.
Numenta, Inc., "Temporal Model Characteristics," Numenta HTM Workshop, 2009, fourteen pages.
Numenta, Inc., "Vision Framework," Jun. 2008, Numenta HTM Workshop, Jun. 23-24, 2008, SRI Campus, Menlo Park, CA, thirty-six pages.
Numenta, Inc., "What Have We Worked on Since the 2008 Workshop? Customer Applications Presentation," Numenta HTM Workshop, 2009, thirty-five pages.
PCT International Search Report and Written Opinion, PCT Application No. PCT/US2011/028231, May 19, 2011, nine pages.

PCT International Search Report and Written Opinion, PCT Application No. PCT/US2008/080347, Dec. 10, 2008, six pages.
Saphir, B. "Numenta Web Services," Numenta HTM Workshop, 2009, twenty pages.
Sdsystem24.com, "HTM Optimized Drug Therapy," Numenta HTM Workshop, Jun. 23-24, 2008, SRI Campus, Menlo Park, CA, seven pages.
Thornton, J. et al., "Robust Character Recognition Using a Hierarchical Bayesian Network," *Proceedings of the 19th Australian Joint Conference on Artifical Intelligence*, 2006, pp. 1259-1264.
U.S. Office Action, U.S. Appl. No. 11/010,243, Jul. 12, 2007, twelve pages.
U.S. Office Action, U.S. Appl. No. 11/351,437, Aug. 23, 2007, sixteen pages.
U.S. Office Action, U.S. Appl. No. 11/351,437, Feb. 20, 2008, six pages.
U.S. Office Action, U.S. Appl. No. 11/622,447, May 28, 2008, eighteen pages.
U.S. Office Action, U.S. Appl. No. 11/622,448, Apr. 30, 2008, seventeen pages.
U.S. Office Action, U.S. Appl. No. 11/622,448, Aug. 24, 2007, nineteen pages.
U.S. Office Action, U.S. Appl. No. 11/945,919, Sep. 7, 2010, nineteen pages.
U.S. Office Action, U.S. Appl. No. 12/029,434, Mar. 28, 2011, twenty-four pages.
U.S. Office Action, U.S. Appl. No. 12/029,434, Nov. 8, 2011, thirty-six pages.
U.S. Office Action, U.S. Appl. No. 12/039,630, Nov. 24, 2010, ten pages.
U.S. Office Action, U.S. Appl. No. 12/039,652, Mar. 29, 2011, fifteen pages.
U.S. Office Action, U.S. Appl. No. 12/040,849, Feb. 3, 2011, thirteen pages.
U.S. Office Action, U.S. Appl. No. 12/040,849, Jul. 1, 2011, eighteen pages.
U.S. Office Action, U.S. Appl. No. 12/147,348, Oct. 11, 2011, forty-three pages.
U.S. Office Action, U.S. Appl. No. 12/288,185, Sep. 15, 2010, eleven pages.
U.S. Office Action, U.S. Appl. No. 12/751,808, Oct. 28, 2010, thirteen pages.
U.S. Office Action, U.S. Appl. No. 13/151,928, Aug. 2, 2011, eight pages.
U.S. Office Action, U.S. Appl. No. 13/218,194, Oct. 5, 2012, fourteen pages.
U.S. Office Action, U.S. Appl. No. 13/227,355, May 25, 2012, twenty-four pages.
U.S. Office Action, U.S. Appl. No. 13/333,865, May 16, 2012, twenty-four pages.
U.S. Appl. No. 13/218,170, filed Aug. 25, 2011.
U.S. Appl. No. 13/218,194, filed Aug. 25, 2011.
U.S. Appl. No. 13/218,202, filed Aug. 25, 2011.
U.S. Appl. No. 13/227,355, filed Sep. 7, 2011.
U.S. Appl. No. 13/415,713, filed Mar. 8, 2012.
U.S. Appl. No. 13/604,543, filed Sep. 5, 2012.
U.S. Appl. No. 12/029,434, filed Feb. 11, 2008.

* cited by examiner

Inbound

|          | C1 | C2 | C3 | C4 | C5 |
|----------|----|----|----|----|----|
| C1       | 0  | 0  | 10 | 0  | 0  |
| C2       | 0  | 0  | 15 | 0  | 0  |
| C3       | 0  | 0  | 0  | 9  | 16 |
| C4       | 0  | 0  | 0  | 0  | 0  |
| C5       | 0  | 0  | 0  | 0  | 0  |

FIG. 5A

Inbound

|      | C1 | C2 | C31 | C32 | C4 | C5 |
|------|----|----|-----|-----|----|----|
| C1   | 0  | 0  | 10  | 0   | 0  | 0  |
| C2   | 0  | 0  | 0   | 15  | 0  | 0  |
| C31  | 0  | 0  | 0   | 0   | 8  | 2  |
| C32  | 0  | 0  | 0   | 0   | 1  | 14 |
| C4   | 0  | 0  | 0   | 0   | 0  | 0  |
| C5   | 0  | 0  | 0   | 0   | 0  | 0  |

HIERARCHICAL TEMPORAL MEMORY SYSTEM WITH HIGHER-ORDER TEMPORAL POOLING CAPABILITY

CROSS-REFERENCE TO RELATED APPLICATIONS

This application claims priority under 35 U.S.C. §119(e) to U.S. Patent Application Ser. No. 61/060,891 entitled "Higher-Order Temporal Pooler" filed on Jun. 12, 2008, which is incorporated by reference herein in its entirety. This application is related to U.S. patent application Ser. No. 12/039,630 entitled "Spatio-Temporal Learning Algorithms in Hierarchical Temporal Networks" filed on Feb. 28, 2008; and U.S. patent application Ser. No. 12/147,348 entitled "Hierarchical Temporal Memory System with Enhanced Inference Capability" filed on Jun. 29, 2007, which are incorporated by reference herein in their entirety.

FIELD OF THE INVENTION

The present invention is related to machine learning using Hierarchical Temporal Memory (HTM) systems, and more specifically to learning sequences of co-occurrences related to a higher-order Markov model.

BACKGROUND

Hierarchical Temporal Memory (HTM) networks represent a new approach to machine intelligence. In a HTM network, training data comprising temporal sequences of spatial patterns are presented to a network of nodes. The HTM network then builds a model of the statistical structure inherent to the patterns and sequences in the training data, and thereby learns the underlying 'causes' of the temporal sequences of patterns and sequences in the training data. The hierarchical structures of the HTM network allow them to build models of very high dimensional input spaces using reasonable amounts of memory and processing capacity.

FIG. 1 is a diagram illustrating a hierarchical nature of the HTM network where the HTM network 10 has three levels L1, L2, L3, with level L1 being the lowest level, level L3 being the highest level, and level L2 being an intermediate level between levels L1 and L3. Level L1 has nodes 11A, 11B, 11C and 11D; level L2 has nodes 12A and 12B; and level L3 has node 13. In the example of FIG. 1, the nodes 11A, 11B, 11C, 11D, 12A, 12B, and 13 are hierarchically connected in a tree-like structure such that each node has several children nodes (that is, nodes connected at a lower level) and one parent node (that is, node connected at a higher level). Each node 11A, 11B, 11C, 11D, 12A, 12B, and 13 may have or be associated with a capacity to store and process information. For example, each node 11A, 11B, 11C, 11D, 12A, 12B, and 13 may store input data (for example, sequences of spatial patterns) associated with particular object or a state of an object. Further, each node 11A, 11B, 11C, 11D, 12A, 12B, and 13 may be arranged to (i) propagate information up the HTM hierarchy to any connected parent node and/or (ii) propagate information down the HTM hierarchy to any connected children nodes.

The HTM training process is a form of unsupervised machine learning. However, in a training stage, indexes attached to the input patterns may be presented to the HTM network to allow the HTM to associate particular categories with the underlying generative causes. Once an HTM network has built a model of a particular input space, it can operate in an inference stage. In the inference stage, novel sequences of input patterns are presented to the HTM network, and the HTM network will generate a 'belief vector' that provides a quantitative measure of the degree of belief or likelihood that the input pattern was generated by the underlying cause associated with each of the indexed categories to which the HTM network was exposed in the training stage.

SUMMARY OF THE INVENTION

Embodiments provide a temporal pooler in a node of a Hierarchical Temporal Memory (HTM) network for generating temporal statistics data representing higher-order temporal sequences of spatial co-occurrences included in training patterns. The temporal pooler may receive information about spatial co-occurrences. The temporal statistics data is provided to an inference engine to determine the likelihood that the temporal sequences of spatial patterns in input patterns correspond to the temporal sequences of spatial co-occurrences present in the training patterns.

In one embodiment, the spatial co-occurrence is received from a spatial pooler linked to the temporal pooler. The spatial pooler providing the spatial co-occurrence may be located in the same node as the temporal pooler. Alternatively, the spatial pooler may be located at a node different from the node in which the temporal pooler is located.

In one embodiment, the temporal pooler splits a spatial co-occurrence into a plurality of sub-occurrences to represent a higher-order Markov model. Each sub-occurrence may be allotted to represent the same spatial co-occurrence in a different temporal sequence.

In one embodiment, the temporal relationships of the sub-occurrences are stored in a connectivity matrix. The connectivity matrix includes columns and rows representing multiple sub-occurrences split from a co-occurrence. Each entry in the connectivity matrix represents frequency or counts of instances where one sub-occurrence transitioned to another sub-occurrence. In the training stage, the connectivity matrix is updated as the information about spatial co-occurrences is received from the spatial pooler.

In one embodiment, the temporal pooler is configured to generate the temporal statistics data by receiving a single round of the sequence of the spatial co-occurrences information. The temporal pooler buffers the sequence of the spatial co-occurrence information. When spatial co-occurrence information for a first time and spatial co-occurrence information for a second time are received, the temporal pooler determines which entry in the connectivity matrix is to be updated based on the spatial co-occurrence information at a third time subsequent to the first time and the second time.

In one embodiment, the temporal pooler determines likelihood of transitions between sub-occurrences by generating a modified connectivity matrix and an activity variable. The modified connectivity matrix is created by adding values to entries of the connectivity matrix to increase the likelihood of otherwise unlikely transitions between sub-occurrences. The activity variable represents likelihood of receiving a co-occurrence at the first time and co-occurrences before the first time based on the temporal relationships represented by the connectivity matrix.

In one embodiment, the temporal pooler generates the temporal statistics data by receiving multiple rounds of the sequence of the spatial co-occurrence information. The temporal pooler maps co-occurrences in second spatial co-occurrence information from the spatial pooler at a second time to sub-occurrences based on first spatial co-occurrence information from the spatial pooler at a first time preceding the second time. The temporal pooler expands the connectivity matrix counter by selectively splitting a co-occurrence in the connectivity matrix to a plurality of sub-occurrences.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

FIG. 5A is a table illustrating a connectivity matrix before splitting a co-occurrence into two sub-occurrences, according to one embodiment of the present invention.

FIG. 5B is a table illustrating a connectivity matrix after splitting a co-occurrence into two sub-occurrences, according to one embodiment of the present invention.

DETAILED DESCRIPTION

Figure 1:
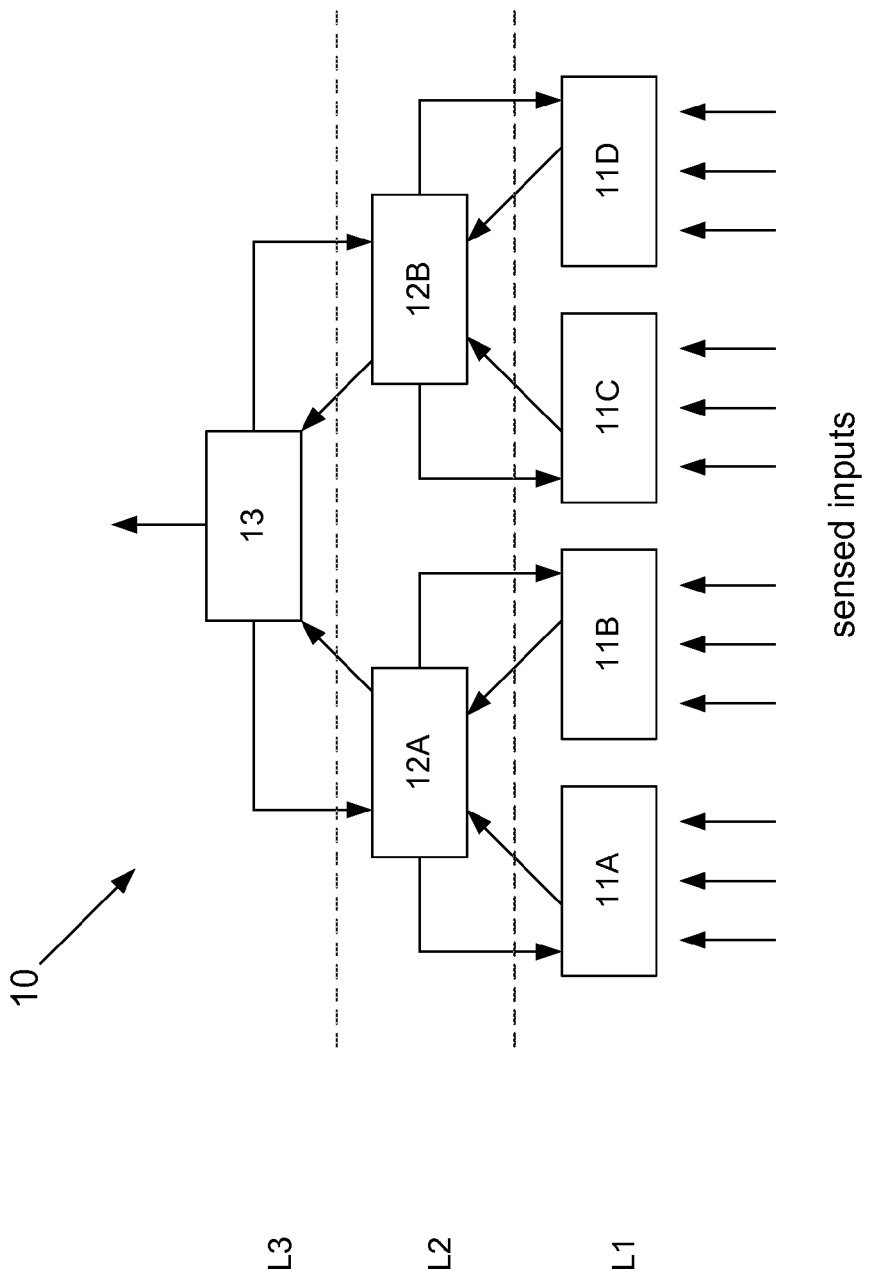
FIG. 1 is a conceptual diagram illustrating a Hierarchical Temporal Memory (HTM) network.

In the following description of embodiments of the present invention, numerous specific details are set forth in order to provide a more thorough understanding of the present invention. However, note that the present invention may be practiced without one or more of these specific details. In other instances, well-known features have not been described in detail to avoid unnecessarily complicating the description.

A preferred embodiment of the present invention is now described with reference to the figures where like reference numbers indicate identical or functionally similar elements. Also in the figures, the left most digits of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

A Hierarchical Temporal Memory (HTM) network is a hierarchical network of interconnected nodes that individually and collectively (i) learn, over space and time, one or more causes of sensed input data and (ii) determine, dependent on learned causes, likely causes of novel sensed input data. In the HTM network, the nodes are hierarchically arranged so that the number of nodes decreases as level increases.

In one embodiment, a HTM node includes only the temporal pooler or the spatial pooler. For example, nodes at the first level of the HTM network may consist of HTM nodes having only spatial poolers, and the nodes at the second level of the HTM network may consist of HTM nodes having only temporal poolers. HTM nodes performing other functions may also be placed within the HTM network. Alternatively, a HTM node may include two or more levels of interconnected temporal poolers.

In one embodiment, one or more nodes of the HTM network receives inputs representing images, videos, audio signals, sensor signals, data related to network traffic, financial transaction data, communication signals (e.g., emails, text messages and instant messages), documents, insurance records, biometric information, parameters for manufacturing process (e.g., semiconductor fabrication parameters), inventory patterns, energy or power usage patterns, data representing genes, results of scientific experiments or parameters associated with operation of a machine (e.g., vehicle operation) and medical treatment data. The HTM network may process such inputs and produce an output representing, among others, identification of object shown in an image, identification of recognized gestures, classification of digital images as pornographic or non-pornographic, identification of email messages as unsolicited bulk email ('spam') or legitimate email ('non-spam'), prediction of a trend in financial market, prediction of failures in a large-scale power system, identification of a speaker in audio recording, classification of loan applicants as good or bad credit risks, identification of network traffic as malicious or benign, identity of a person appearing in the image, processed natural language processing, weather forecast results, patterns of a person's behavior, control signals for machines (e.g., automatic vehicle navigation), gene expression and protein interactions, analytic information on access to resources on a network, parameters for optimizing a manufacturing process, predicted inventory, predicted energy usage in a building or facility, web analytics (e.g., predicting which link or advertisement that users are likely to click), identification of anomalous patterns in insurance records, prediction on results of experiments, indication of illness that a person is likely to experience, selection of contents that may be of interest to a user, indication on prediction of a person's behavior (e.g., ticket purchase, no-show behavior), prediction on election, predict/detect of adverse events, a string of texts in the image, indication representing topic in text, a summary of text or prediction on reaction to medical treatments, A parent node is located at a higher level of the hierarchy compared to a child node. Nodes at different levels may process information differently.

Information about spatial co-occurrences refers to a value or a set of values indicating likelihood that an input pattern received at a node of the HTM network includes a co-occurrence. In one embodiment, the spatial co-occurrences information is a vector with elements, each element indicating the probability that a co-occurrence is present in the input pattern. In another embodiment, the spatial co-occurrences information indicates a single co-occurrence that is most likely to be present in the input pattern. The co-occurrence most likely to be present in the input pattern is also referred to as "winning co-occurrence" herein.

Embodiments provide a temporal pooler in a HTM network capable of storing information about sequences of higher-order co-occurrences by splitting a co-occurrence into a plurality of sub-occurrences. Each split sub-occurrence may be part of a distinct sequence of co-occurrences. The temporal pooler receives the probability of spatial co-occurrences in training patterns and tallies frequencies of transitions from one sub-occurrence to another sub-occurrence in a connectivity matrix. The connectivity matrix is then processed to generate temporal statistics data. The temporal statistics data is provided to an inference engine to perform inference or prediction on input patterns. By storing information related to connection of higher-order sequences, the temporal statistics data may more accurately reflect long temporal sequences of co-occurrences in the training patterns.

Overview of HTM Network Operation

In one embodiment, the HTM network 10 operates in two stages: (i) a training stage and (ii) an inference stage. In the training stage, nodes at different levels of the HTM network 10 are placed in a training mode, and then progressively transitioned to an inference mode as the training at one level is finished. After training all the levels of the HTM network 10, the inference stage is initiated where all the nodes in the HTM network 10 are placed in an inference mode, and the top node of the HTM network generates an output.

Figure 2:
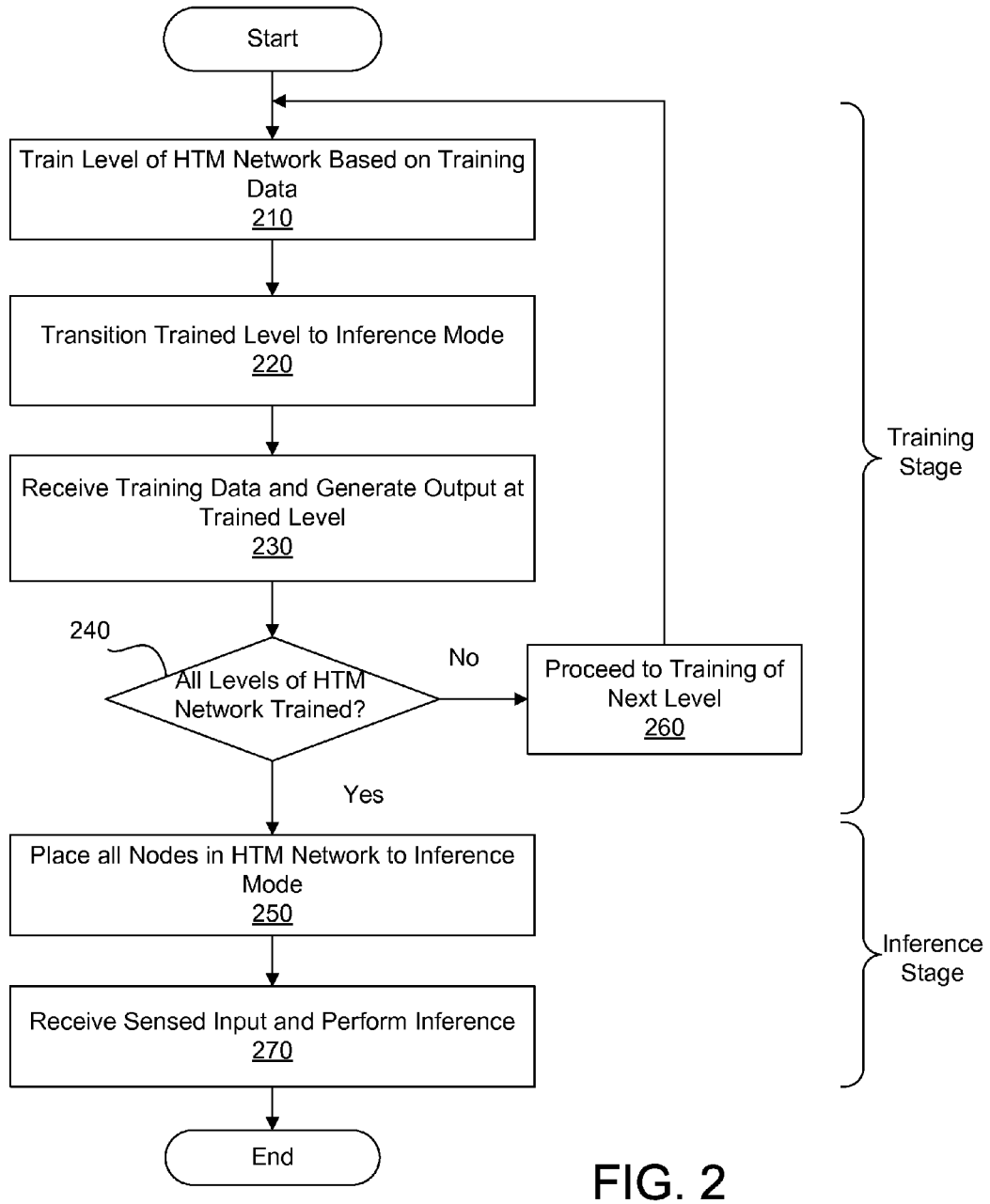
FIG. 2 is a flowchart illustrating a method of operating the HTM network, according to one embodiment of the present invention.

FIG. 2 is a flowchart illustrating a method of operating the HTM network 10, according to one embodiment of the present invention. First, a level of the HTM network 10 is trained 210 based on training data. For example, the nodes 11A, 11B, 11C and 11D in the first level L1 of the HTM network 10 of FIG. 1 are trained by providing the training data to the nodes 11A, 11B, 11C and 11D. Then the trained nodes (e.g., the nodes 11A, 11B, 11C and 11D of the HTM network 10) are transitioned 220 to an inference mode. After transitioning to the inference mode, the trained nodes receive the same training data and generate 230 intermediate outputs in response to the training data. When a node transitions from the training mode to the inference mode, the node compiles and processes the training data. Depending on the learning mechanism employed, the same training data may be fed more than once to the nodes for training.

Then it is determined 240 if all the levels of the HTM network 10 are trained. If not all the levels of the HTM network are trained, the process proceeds 260 to train the next level, typically a higher level. For example, after training the nodes 11A, 11B, 11C and 11D of first level L1, the process proceeds to train nodes 12A and 12B in the second level L2. Intermediate outputs from the nodes 11A, 11B, 11C and 11D function as training data for the nodes 12A and 12B in second level L2. The same process is repeated until all levels of the nodes are trained based on the training data received from their children nodes.

In one embodiment, when training the top node 13 of the HTM network 10 after training lower nodes of the HTM network, category information indicating the correct category of the training data is provided to the top node 13. In response, the top node 13 generates mapping information that maps the outputs from its children nodes (e.g., the nodes 12A and 12B) to the correct category. In this way, the top node 13 may output a category identifier corresponding to the sensed inputs in the inference stage.

If it is determined 240 that all the levels of the HTM network 10 are trained, then all the nodes of the HTM network 10 are placed 250 in the inference mode to start the inference stage. In the inference stage, the nodes 11A, 11B, 11C and 11D at the lowest hierarchy of the HTM network 10 receive 270 a sensed input. The nodes in the HTM network then generates their outputs using a mechanism disclosed, for example, in U.S. patent application Ser. No. 12/039,630 entitled "Spatio-Temporal Learning Algorithms in Hierarchical Temporal Networks" filed on Feb. 28, 2008; and U.S. patent application Ser. No. 12/147,348 entitled "Hierarchical Temporal Memory System With Enhanced Inference Capability" filed on Jun. 29, 2007, which are incorporated by reference herein in their entirety. In one embodiment, feedback signals from the nodes at higher levels may be provided to the nodes at lower levels of the HTM network 10. The top node 13 receives information from the lower nodes and generates a category identifier corresponding to the sensed inputs.

In one embodiment, at least one of the nodes in the HTM network includes a spatial pooler and a temporal pooler. In a typical HTM node, the spatial pooler collects sensed input or outputs from lower nodes and learns spatial groups of patterns (hereinafter referred to as "spatial co-occurrence"). Specifically, the spatial pooler learns spatial co-occurrences in a set of input patterns received at the HTM node. Spatial pooling is dependent on "spatial" similarities between two or more patterns (a pattern may actually represent a sequence from a lower level). In embodiments where spatial pooling is used, an HTM node may compare a spatial property of a received sensed input pattern with that of a learned sensed input pattern (or "quantization" point). If the two patterns are "similar enough" (that is, the distance between the two patterns are within a predetermined threshold), then the received sensed input pattern may be assigned to the same cause as that of the quantization point. Hence, the spatial pooler generates the same output from the similar input patterns. The similarity needed for "spatial" pooling may vary within and/or among HTM-based systems.

The outputs from the spatial poolers are provided to the temporal pooler. The temporal pooler learns sequences of co-occurrences that occur at a rate statistically greater than what would be expected by mere chance. The temporal pooler may be classified into a first order temporal pooler and higher-order temporal (HOT) pooler. The first order temporal pooler is capable of implementing and detecting sequences of for which the first order Markov model holds: given the present pattern, future patterns are independent of previous patterns. The first order temporal pooler is disclosed, for example, in U.S. patent application Ser. No. 12/039,630. The HOT pooler is capable of storing models representing a first order Markov chain as well as second or higher-order sequential patterns. Embodiments of the present invention provide HOT poolers for generating a model related to higher-order sequences.

Higher-Order Sequences

Figure 3A:
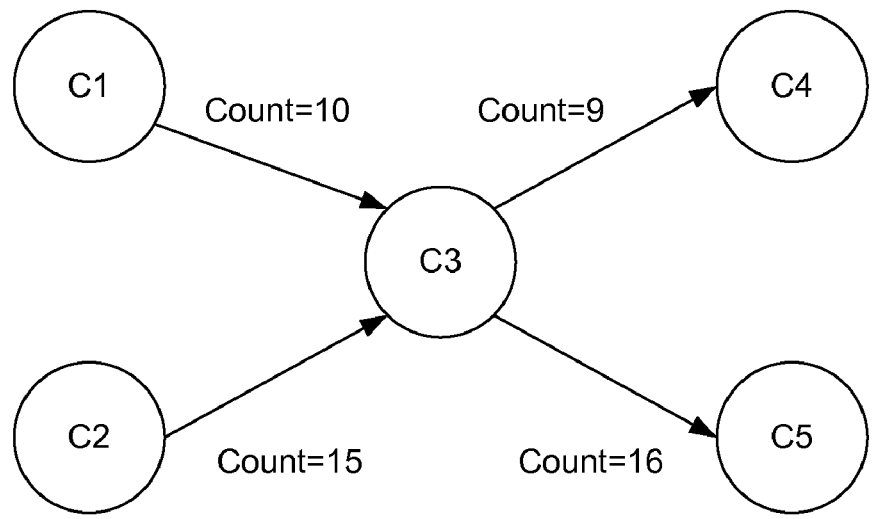
FIG. 3A is a graph illustrating a Markov chain before splitting a co-occurrence into two sub-occurrences, according to one embodiment of the present invention.

Many data representing real-world events are related to higher-order Markov models. Data related to motions and music, for example, require modeling of sequences in higher-order. FIG. 3A is a graph illustrating a Markov chain showing co-occurrences C1 through C5 in a first order graph. The first order Markov model keeps track of the likelihood of one co-occurrence following another co-occurrence but does not keep track of co-occurrences appearing further back in the past. Taking the example of FIG. 3A, the first order Markov model keeps track of transition counts from C1 to C3 (count=10), C2 to C3 (count=15), C3 to C4 (count=9), and C3 to C5 (count=16). Based on this first order Markov model, the likelihood of the co-occurrence C4 or C5 following C3 may be predicted or inferred. The first order Markov model, however, does not allow consideration of whether the co-occurrences C1 or C2 preceded the co-occurrence C3 for the purpose of predicting or inferring the co-occurrence to appear after the co-occurrence C3. Hence, a lower order Markov Model may be more ambiguous in terms of how the sequences or co-occurrences are arranged compared to a higher order Markov Model.

Figure 3B:
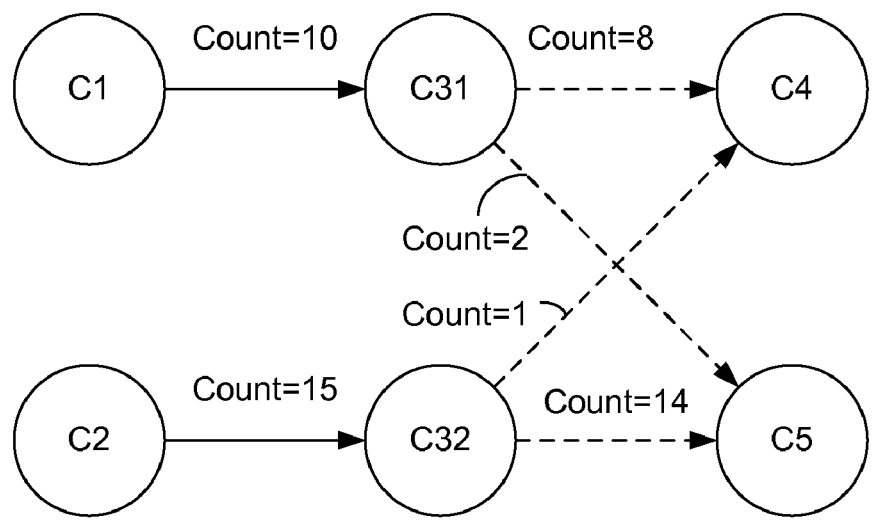
FIG. 3B is a graph illustrating a Markov chain where a co-occurrence is split into two sub-occurrences, according to one embodiment of the present invention.

FIG. 3B is a graph illustrating a Markov chain showing co-occurrences C1 through C5 in a second order model by splitting or replicating a co-occurrence into two sub-occurrences, according to one embodiment of the present invention. Sub-occurrences are co-occurrences split or replicated from a co-occurrence in a lower order Markov model to create a higher order Markov model of sequences. The sub-occurrences may be created for all co-occurrences or be created for selected co-occurrences. In FIG. 3B, co-occurrences C31 and C32 are sub-occurrences split from the co-occurrence C3 of FIG. 3A.

In the example of FIG. 3B, the sub-occurrences C31 and C32 are connected by dashed lines representing counts of instances where the co-occurrence C4 or C5 followed the sequences of co-occurrences C1-C3 (represented as C1-C31) or co-occurrences C2-C3 (represented as C2-C32). Specifically, the Markov chain of FIG. 3B indicates eight instances where the co-occurrence C4 followed the sequence of C1-C3, two instances where the co-occurrence C5 followed the sequence of C1-C3, one instance where the co-occurrence C4 followed the sequence of co-occurrences C2-C3, and fourteen instances where the co-occurrence C5 followed the sequence of co-occurrences C2-C3. By using this information, which one of co-occurrences C4 and C5 are more likely to follow after co-occurrence C3 can be determined taking into account which co-occurrence preceded the co-occurrence C3.

By generalization, the Nth order of Markov model may be implemented by splitting a co-occurrence into a plurality of sub-occurrences. The maximum order of a Markov model is restricted by limited memory space and the number of unique sequences in the training data.

Example HTM Node Detecting Higher-Order Sequences

Figure 4A:
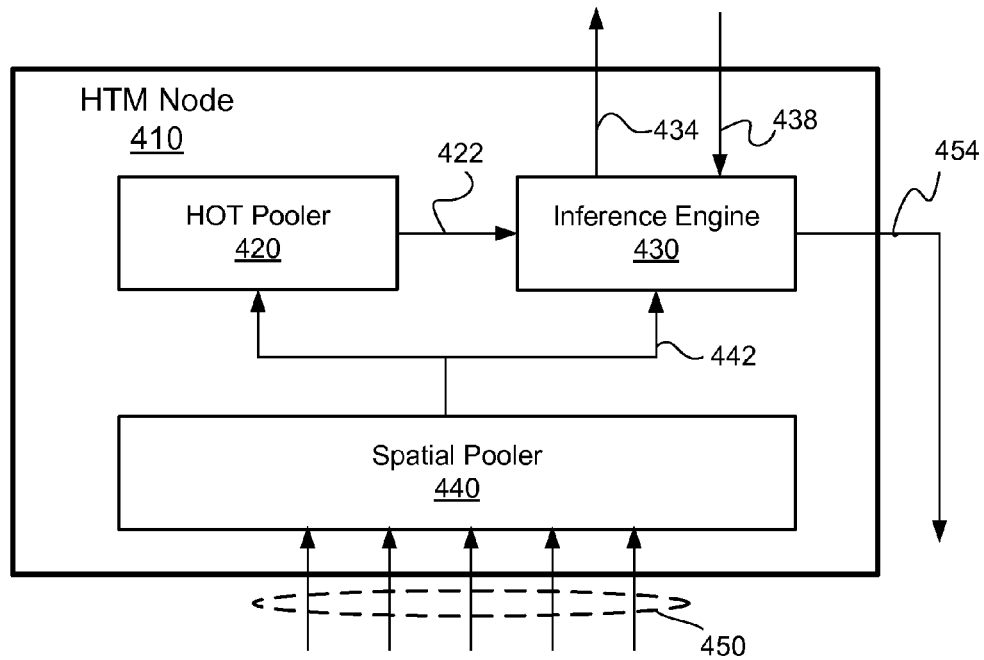
FIG. 4A is a functional block diagram of a HTM node for generating temporal statistics data related to a higher-order Markov model, according to one embodiment of the present invention.

FIG. 4A is a functional block diagram of a HTM node 410 for generating temporal statistics data representing a model related to a higher-order Markov chain, according to one embodiment of the present invention. The HTM node 410 may include, among other components, a higher-order temporal (HOT) pooler 420, an inference engine 430, and a spatial pooler 440. The HOT pooler 420 is coupled to the spatial pooler 440 to receive the probabilities $P(e^-_t|C)$ of co-occurrences during the training stage. The probabilities $P(e^-_t|C)$ is also referred to as evidence $e^-_t$ herein. The inference engine 430 is coupled to the spatial pooler 440 and the HOT pooler 420. The inference engine 430 receives the probabilities $P(e^-_t|C)$ of co-occurrences during the inference stage. The inference engine 430 is also coupled to the HOT pooler 420 to receive the temporal statistics data 422.

The function and operation of the spatial pooler 440 is essentially the same as the spatial spooler described, for example, in U.S. patent application Ser. No. 12/039,630 entitled "Spatio-Temporal Learning Algorithms in Hierarchical Temporal Networks" filed on Feb. 28, 2008, which is incorporated by reference herein in its entirety. The spatial pooler 440 receives input patterns 450 and identifies spatial co-occurrences among the input patterns 50. At each time-step, the spatial pooler 440 outputs a set of probabilities $P(e^-_t|C)$ 442 for a spatial pattern, where $P(e^-_t|C)$ represents the probability of observing $e^-$ (evidence or input patterns from a lower level) at time t over learned spatial co-occurrences C. Thus, for example, at time t, the first entry in $P(e^-_t|C)$ is $P(e^-_t|C_1)$, the second entry is $P(e^-_t|C_2)$, and so forth. In one embodiment, the spatial pooler 440 provides the set of probabilities $P(e^-_t|C)$ 442 to the HOT pooler 420 in the training mode and to the inference engine 430 in the learning mode.

The HOT pooler 420 is hardware, software, firmware or a combination thereof responsible for detecting temporal sequences of a higher-order. The HOT pooler 420 maintains a connectivity matrix to tally the probabilities $e^-_t$ of co-occurrences received from the spatial pooler 440, as described below in detail with reference to FIGS. 5A and 5B. In one embodiment, the HOT pooler 420 is a HOT pooler 600, as described below in detail with reference to FIG. 6. In another embodiment, the HOT pooler 420 is a HOT pooler 800, as described below in detail with reference to FIG. 8. The HOT pooler 420 generates the temporal statistics data 422 from the connectivity matrix and provides the temporal statistics data 422 to the inference engine 430.

The inference engine 430 is hardware, software, firmware or a combination thereof responsible for generating a bottom-up message 434 based on the probabilities $e^-_t$ 442 and the temporal statistics data 422, as described, for example, in U.S. patent application Ser. No. 12/147,348 entitled "Hierarchical Temporal Memory System with Enhanced Inference Capability" filed on Jun. 29, 2007, which is incorporated by reference herein in its entirety. In one embodiment, the inference engine 430 includes a bottom-up message generator and a top-down message generator, as described in U.S. patent application Ser. No. 12/147,348. The inference engine 430 also received a top-down message 438 and generates a feedback message 454 to a child node of the HTM node 410 (if a child node is connected to the HTM node 410).

In one embodiment, the inference engine 430 generates a bottom-up message representing predictions based on input data received at the HTM node 410. The inference engine 430 may run multiple iterations to generate outputs representing predictions multiple time steps ahead of the current time step. Further, in the inference stage, the bottom-up message may indicate a plurality of top predictions.

In one embodiment, the function of the inference engine 430 is performed by the HOT pooler 420 and the inference engine 430 is omitted. In this embodiment, the HOT pooler 420 receives the probabilities $e^-_t$ in the inference stage and generates a message to a parent node, as disclosed, for example, in U.S. patent application Ser. No. 12/039,630 entitled "Spatio-Temporal Learning Algorithms in Hierarchical Temporal Networks" filed on Feb. 28, 2008, which is incorporated by reference herein in its entirety.

Figure 4B:
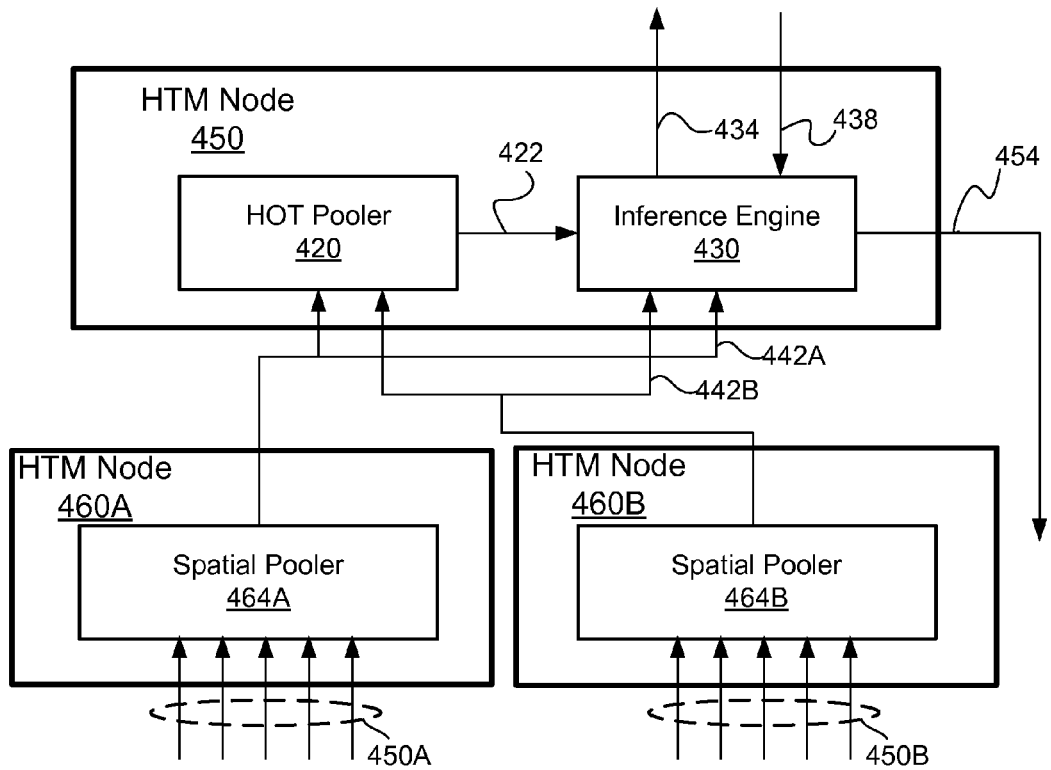
FIG. 4B is a functional block diagram illustrating a portion of the HTM network, according to one embodiment of the present invention.

FIG. 4B is a block diagram illustrating a portion of the HTM network, according to one embodiment of the present invention. The portion of the HTM network may include, among others, a HTM node 450, a HTM node 460A and a HTM node 460B. The HTM node 450 receives a first set of probabilities 442A and a second set of probabilities from the HTM nodes 460A and 460B. The sets of probabilities 442A and 442B may be concatenated and processed at the HTM nodes 460A and 460B.

The HTM node 460A and the HTM node 460B may include, among others, spatial poolers 464A and 464B, respectively. The spatial poolers 464A and 464B receives the input patterns 450A and 450B and generates the set of probabilities 442A and 442B in a manner essentially the same as the spatial pooler 440 of FIG. 4A.

The HTM node 450 may include, among others, a HOT pooler 420 and the inference engine 430. The HTM node 450 is essentially the same as the HTM node 410 of FIG. 4A except that the HTM node 450 does not include a spatial pooler. Other than receiving and concatenating the sets of probabilities 442 and 442B received from the HTM nodes 460A and 460B, the function and operation of the HOT pooler 420 and the inference engine 430 of FIG. 4B are essentially the same as those of HOT pooler 420 and the inference engine 430 of FIG. 4A.

Connectivity Matrix

In order to generate the temporal statistics data 422 representing a higher-order Markov sequence of co-occurrences, the HOT pooler 420 maintains a connectivity matrix. The connectivity matrix managed by the HOT pooler 420 is similar to the time adjacency matrix described, for example, in U.S. patent application Ser. No. 12/039,630 entitled "Spatio-Temporal Learning Algorithms in Hierarchical Temporal Networks" filed on Feb. 28, 2008, which is incorporated by reference herein in its entirety, except that the connectivity matrix retains much more detailed information about the sequential order of the occurrences. Rather, the time adjacency matrix retains information on how close in time the co-occurrences (for example, C1 and C2) appeared in a sequence. In embodiments of the present invention, the time adjacency matrix is replaced with a connectivity matrix to accommodate a higher-order sequence.

FIGS. 5A and 5B are tables illustrating connectivity matrixes, according to one embodiment of the present invention. The rows of the connectivity matrices in FIGS. 5A and 5B represent preceding co-occurrences or sub-occurrences in a transition (hereinafter referred to as "outbound occurrences"). The columns of the connectivity matrices represent subsequent co-occurrences or sub-occurrences in the transition (hereinafter referred to as "inbound occurrences"). FIG. 5A is an example of the connectivity matrix corresponding to the Markov chain of FIG. 3A. For example, the count of 10 in the entry where a row of co-occurrence C1 intersects with a column of co-occurrence C3 indicates that 10 instances of transition from co-occurrences C1 to co-occurrence C3 were observed. The column and the row may be interchanged so that the columns represent the outbound occurrences and the rows represent the inbound occurrences. Arrangements or mechanisms other than the connectivity matrix may also be used to store the temporal relationship between the co-occurrences.

When the co-occurrences are split into sub-occurrences, the rows and columns of the connectivity matrix are expanded to accommodate the sub-occurrences. FIG. 5B is an example of the connectivity matrix corresponding to the Markov chain of FIG. 3B. In the Markov chain of FIG. 3B, the co-occurrence of C3 is split into sub-occurrences C31 and C32. The connectivity matrix of FIG. 5B mirrors the Markov chain of FIG. 3B by splitting a row and a column for co-occurrence C3 in FIG. 5A into two rows and two columns for sub-occurrences C31 and C32. Taking the example of sequence C31-C4, a count of eight is indicated in the fifth column and the third row of the connectivity matrix in FIG. 5B.

In one embodiment, the HOT pooler 420 updates the connectivity matrix as the probabilities $e^-_t$ 442 are received from the spatial pooler 440. After the training of the HTM node 410, the HOT pooler 420 compiles and processes the connectivity matrix into the temporal statistics data 422.

Multi-round Higher-Order Temporal Pooler

Figure 6:
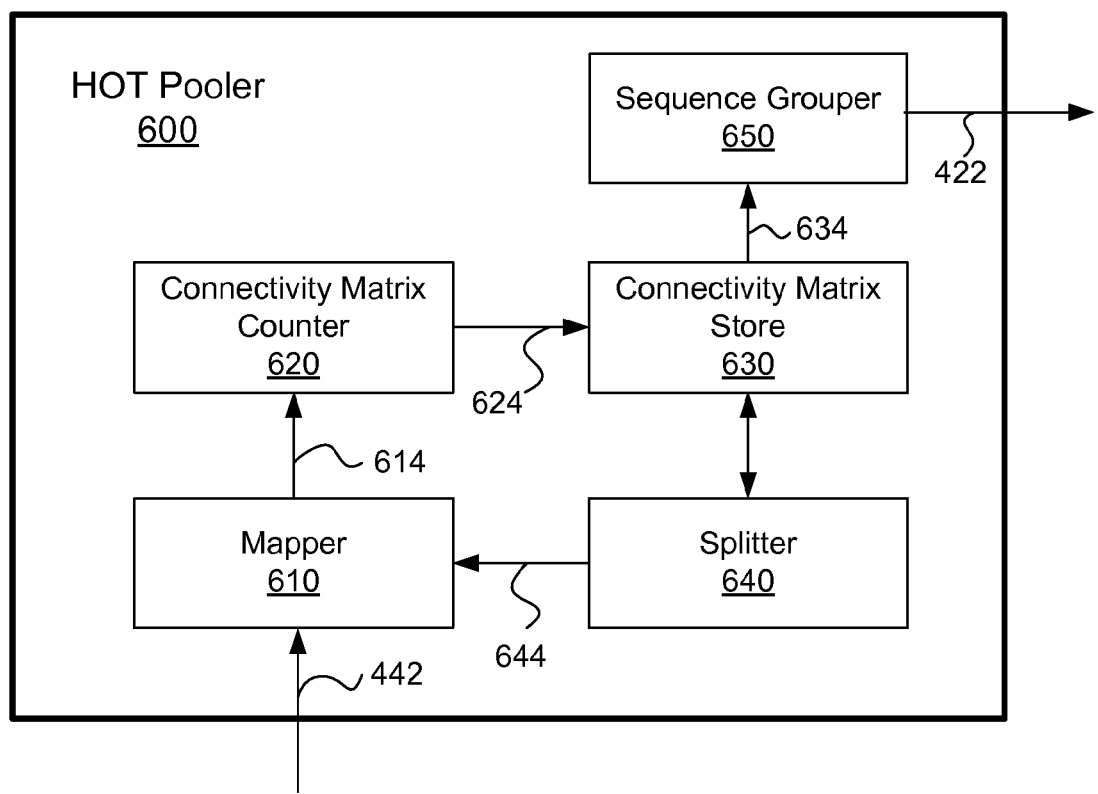
FIG. 6 is a higher-order temporal (HOT) pooler, according to one embodiment of the present invention.

FIG. 6 is a block diagram illustrating a HOT pooler 600, according to one embodiment of the present invention. The HOT pooler 600 receives the same sequence of input probabilities $e^-_t$ 442 for N rounds of times. The HOT pooler 600 may include, among other components, a mapper 610, a connectivity matrix counter 620, a connectivity matrix store 630, a splitter 640 and a sequence grouper 650. The mapper 610 is coupled to the connectivity matrix counter 620 to provide translated probabilities 614. The connectivity matrix counter 620 is coupled to the connectivity matrix store 630 to provide instructions 624 to update the connectivity matrix. The splitter 640 is coupled to the connectivity matrix store 630 to analyze and split co-occurrences or sub-occurrences. The splitter 640 is also coupled to the mapper 610 to provide mapping update information 644. The connectivity matrix store 630 is coupled to the sequence grouper 650 to provide the connectivity matrix 634. In one embodiment, the splitter 640 also merges sub-occurrences, deletes sub-occurrences and modifies the sub-occurrences to find a more accurate and efficient model of the temporal sequences.

The mapper 610 receives the probabilities of spatial co-occurrences $e^-_t$ 442 from the spatial pooler 440. The mapper 610 includes a buffer for storing probabilities (e.g., $e^-_{t-1}$ and $e^-_{t-2}$) received at previous time steps. Based on the probabilities of spatial co-occurrences stored in the buffer, the mapper 610 maps co-occurrences in the probabilities of co-occurrences $e^-_t$ 442 of to sub-occurrences in the connectivity matrix. The mapper 610 may buffer probabilities of co-occurrences going further back in time in order to select sub-occurrences that encode long distinct sequences. The mapper 610 generates the translated probabilities 614 by mapping the probabilities $e^-_t$ 442 to the probabilities of sub-occurrences. The translated probabilities 614 are then sent to the connectivity matrix counter 620. The translated probabilities 614 are probabilities of co-occurrences mapped to probabilities of sub-occurrences in the connectivity matrix based on the previously received probabilities of co-occurrences. In one embodiment, the mapping is assigned without previous data.

The connectivity matrix counter 620 receives the translated probabilities 614 from the mapper and sends the instructions 624 to the connectivity matrix store 640 for updating the connectivity matrix. The instructions 624 indicate entries in the connectivity matrix to update and the amount to be incremented in each entry. The connectivity matrix counter 620 may also receive instructions to weaken or delete entries in the connectivity matrix. This may be thought of as "forgetting" and may help generalize to new future data or to improve the efficient utilization of limited resources.

The connectivity matrix store 630 stores the connectivity matrix representing the temporal sequences of co-occurrences received at the HOT pooler 600. The connectivity matrix store 630 receives the instructions 624 and updates the entries in the connectivity matrix. After updating the counts based on received co-occurrences, the connectivity matrix in the connectivity matrix store 630 is (i) accessed by the splitter 640 to split co-occurrence(s) or sub-occurrences and updated by another round of the same probabilities of spatial co-occurrences $e^-_t$ 442 or (ii) accessed by the sequence grouper 650 to generate the temporal statistics data 422. In one embodiment, the connectivity matrix also stores additional values at each row and column, such as time stamps, permanence and other simple statistics.

After probabilities $e^-_t$ 442 for a set of training data are received and processed, the splitter 640 accesses the connectivity matrix store 630 to select any co-occurrences or sub-occurrences to be split into two or more sub-occurrences. Specifically, the splitter 640 determines which occurrence or sub-occurrence to split based on rules that may include, among others, the following: (i) avoid splitting of occurrences or sub-occurrences which appear in the sequence infrequently (i.e., below a threshold number of times), and (ii) avoid splitting of co-occurrences or sub-occurrences which are inbound occurrences predominantly from one outbound occurrence. After determining which co-occurrences or sub-occurrences to split, the splitter 644 expands the connectivity matrix by splitting selected co-occurrences or sub-occurrences. The splitter 644 also sends the mapping update information 644 to the mapper 610 to update the mapping between co-occurrences and the sub-occurrences to prepare the mapper 610 for the next round of the probabilities 442.

The sequence grouper 650 receives the connectivity matrix 634 from the connectivity matrix store 630 and partitions the co-occurrence, sub-occurrences and their connections into groups representing sequences learned by the HOT pooler 600. The sequence grouper 650 then sends a description of the sequences determined from partitioning to the inference engine 430 in the form of the temporal statistics data 422. The description of the sequences may be a partition of the sub-occurrences and may include overlapping sets of sub-occurrences or skip some sub-occurrences. The sequences may also include information about likely starting and ending points, gathered from the connectivity between sub-occurrences in one sequence to sub-occurrences in other sequences.

Figure 7:
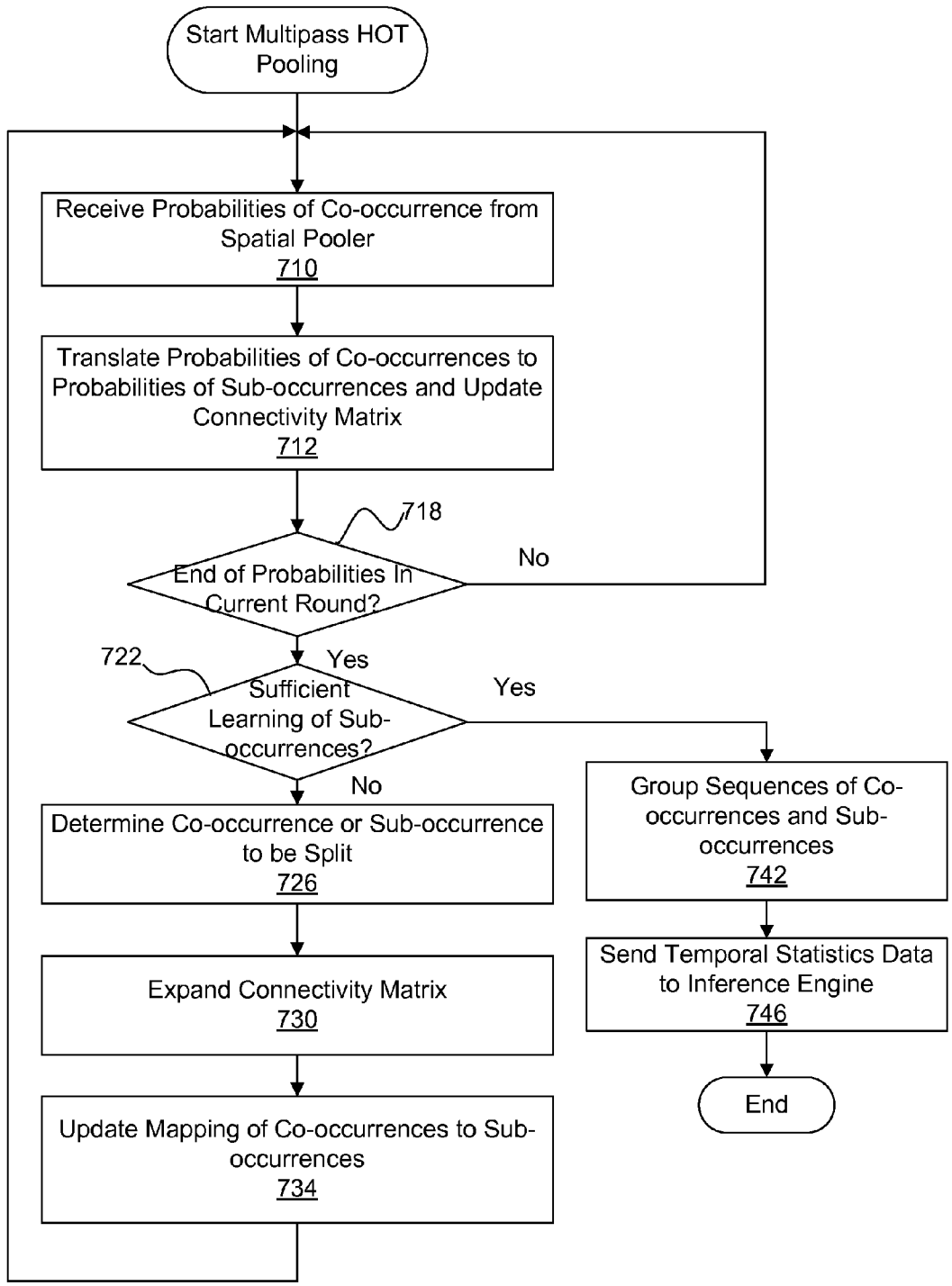
FIG. 7 is a method of operating a HOT pooler, according to one embodiment of the present invention.

FIG. 7 is a flow chart illustrating a method of operating the HOT pooler 600, according to one embodiment of the present invention. First, the HOT pooler 600 receives 710 probabilities $e^-_t$ 442 of co-occurrences from the spatial pooler 440. The HOT pooler 600 then translates the probabilities $e^-_t$ 442 of co-occurrences to probabilities of sub-occurrences and updates 712 the connectivity matrix accordingly. Then it is determined 718 whether all inputs in the current round have been processed. If not, the process returns to receive 710 the next probabilities and repeats the process.

If all inputs in the current round have been used, the process proceeds to determine 722 if valid sub-occurrences were learned and connections of sufficient strength have been formed, given the training data and available capacity limits. If it is determined that more sub-occurrences and better statistics are needed, the splitter 640 determines 726 the co-occurrence or sub-occurrence to be split. Then the connectivity matrix is expanded 730 to include rows and columns of the split co-occurrence or sub-occurrence. The splitter 640 also updates 734 the mapping of co-occurrences to sub-occurrences stored in the mapper 610 based on the splitting of co-occurrences or sub-occurrences.

Then the process returns to repeat another round of probabilities $e^-_t$ 442 that is same as the probabilities $e^-_t$ received in the previous round. Specifically, the process returns to receive 710 the set of probabilities $e^-_t$ 442 and repeats the updating 712 of the connectivity matrix. In one embodiment, the next round of training data may use data different data compared to the training data in the previous round.

If it is determined 722 that sufficient sub-occurrences and connectivity counts have been learned, then the process proceeds to group or partition 742 sequences of co-occurrences and sub-occurrences to generate the temporal statistics data 422. Specifically, the sequence grouper 650 partitions the Markov chain represented by the connectivity matrix into one or more groups, for example, as described in U.S. patent application Ser. No. 12/039,630 entitled "Spatio-Temporal Learning Algorithms in Hierarchical Temporal Networks" filed on Feb. 28, 2008, which is incorporated by reference herein in its entirety. Alternatively, the sequence grouper 650 partitions the Markov chain using Agglomerative Hierarchical Clustering method to generate the temporal statistics data 422. Agglomerative Hierarchical Clustering method is well known; and, descriptions thereof are omitted herein for the sake of brevity. In one embodiment, weak connections are eliminated, and likely starting and ending points of a sequence is identified using statistical measures on the connectivity matrix. Sets of connected sub-occurrences may be identified after deleting weak connections and connecting between ending and starting points. The connected sub-occurrences may be marked as sequences.

After the temporal statistics data 422 is generated, the temporal statistics data 422 are sent 746 to the inference engine 430. Then the process of learning sequences at the HOT node 600 is terminated.

Single-Round Higher-Order Temporal Pooler

Figure 8:
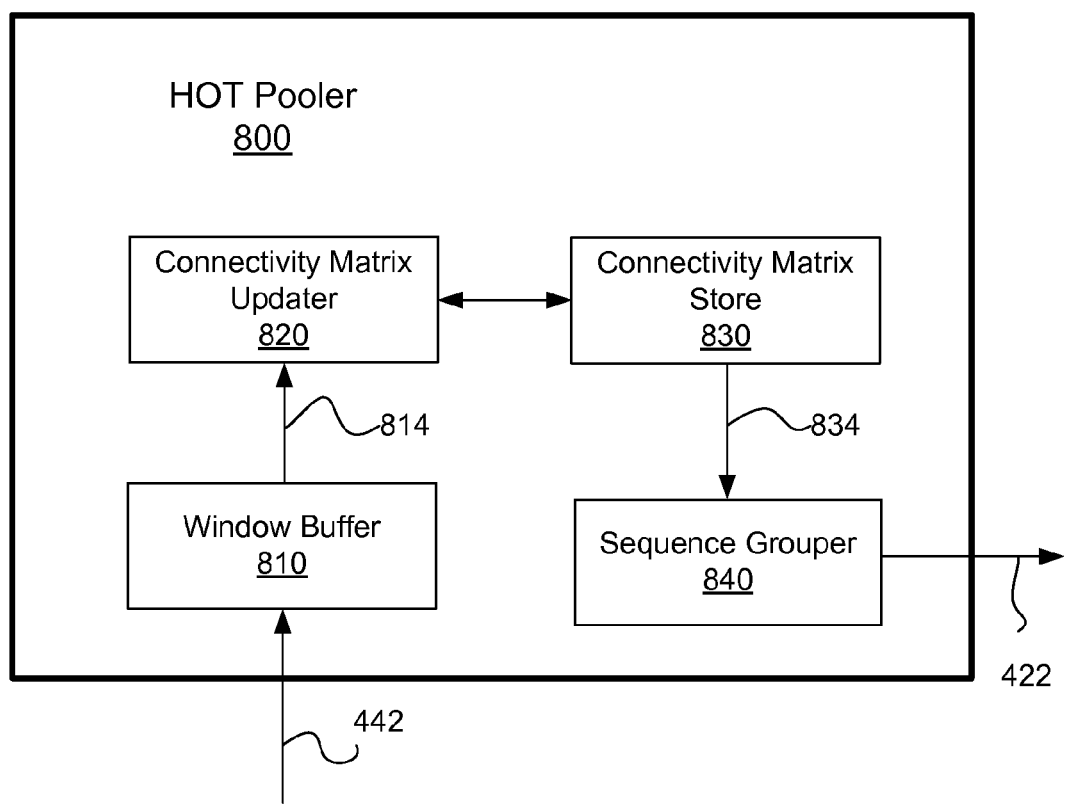
FIG. 8 is a functional block diagram of a HOT pooler, according to one embodiment of the present invention.

FIG. 8 is a functional block diagram of a HOT pooler 800, according to one embodiment of the present invention. Unlike the HOT pooler 600, the HOT pooler 800 is capable of generating the connectivity matrix representing higher-order Markov chain using a single round of sequences instead of multiple rounds of the same sequences. For this purpose, the HOT pooler 800 allots a predetermined number of sub-occurrences to a co-occurrence and employs a window buffer 810 to store probabilities of co-occurrences for multiple time steps. The order of the Markov model implemented by the HOT pooler 800 is determined by how many states are allotted to the same co-occurrence.

The HOT pooler 800 may include, among other components, a window buffer 810, a connectivity matrix updater 820, a connectivity matrix store 830, and a sequence grouper 840. The window buffer 810 is coupled to the connectivity matrix updater 820 to provide probabilities 814 of future sub-occurrences that appear after the current co-occurrences. The connectivity matrix updater 820 is coupled to the connectivity matrix store 830 to update the connectivity matrix. The sequence grouper 840 is coupled to the connectivity store 830 to receive the connectivity matrix 834 after the connectivity matrix 834 is updated by the training data.

The window buffer 810 receives and stores a predetermined number of probabilities received from the spatial pooler 440. Specifically, the window buffer 810 stores the probabilities of co-occurrences across multiple time steps. The probabilities are provided to the connectivity matrix updater 820 to determine the likelihood of transition between a sub-occurrence at time t and a sub-occurrence at time t+1 based on the probabilities of co-occurrences across multiple time steps.

The connectivity matrix updater 820 receives co-occurrences 814 from the window buffer 810 and determines entries in the connectivity matrix to be incremented and the amount to be incremented. In one embodiment, the connectivity matrix updater 820 uses probabilities of future co-occurrences for W length of time (i.e., $e^-_{t+1}, e^-_{t+2}, \ldots, e^-_{t+W}$) to update entries of the connectivity matrix corresponding to the transition of sub-occurrence at time t to sub-occurrence at time t+1. That is, the processing at the connectivity matrix updater 820 is lagged by the size W of the buffer window. When the lag must be shortened, W can be temporarily decreased. When extra lag is acceptable, W may be increased for more accurate sequence learning.

The connectivity matrix store 830 stores the connectivity matrix. The HOT pooler 800 receives information about the number of co-occurrences classified by the spatial pooler 440 and initializes the connectivity matrix to include rows and columns for a predetermined number of sub-occurrences. Contrary to the HOT pooler 600 where co-occurrences are selected for splitting into sub-occurrences after each round of training data, the connectivity matrix allots a predetermined number of sub-occurrences to all or any co-occurrences before the training data are received at the HOT pooler 800. Predetermination may be used with sparse storage of only connected states to efficiently emulate dynamic creation of sub-occurrence when storage memory is limited. Further, splitting processes expressed earlier can be combined with predetermined sub-occurrences if it becomes necessary to increase the capacity from its initial limits In one embodiment, the sequence grouper 840 receives the connectivity matrix 834 from the connectivity matrix store 830 after the connectivity matrix 834 is updated based on the training data. The sequencer grouper 840 partitions the co-occurrences and sub-occurrences into groups of sub-occurrences and their connections. Specifically, the sequence grouper 840 partitions the interconnected matrix into one or more groups, for example, as described in U.S. patent application Ser. No. 12/039,630 entitled "Spatio-Temporal Learning Algorithms in Hierarchical Temporal Networks" filed on Feb. 28, 2008, which is incorporated by reference herein in its entirety. Alternatively, the sequence grouper 840 partitions the Markov chain using Agglomerative Hierarchical Clustering method to generate the temporal statistics data 422. Agglomerative Hierarchical Clustering method is well known; and, descriptions thereof are omitted herein for the sake of brevity. The sequence grouper 840 then sends information of the sequences determined by partitioning the Markov chain to the inference engine 430 in the form of the temporal statistics data 422.

Figure 9:
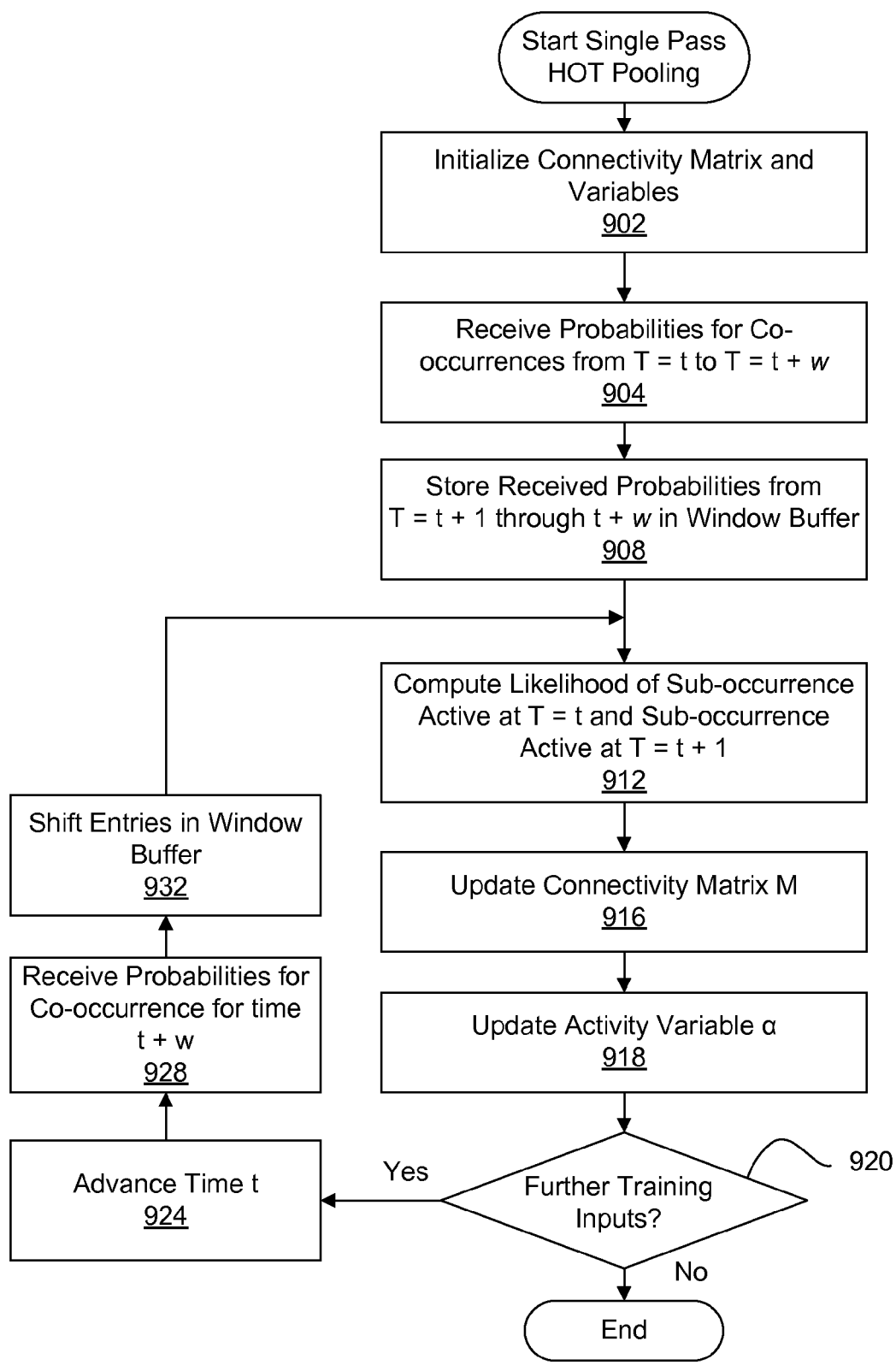
FIG. 9 is a flowchart illustrating a method of operating a HOT pooler, according to one embodiment of the present invention.

FIG. 9 is a flowchart illustrating a method of operating the HOT pooler 800, according to one embodiment of the present invention. First, a connectivity matrix M and variables are initialized 902. In one embodiment, the number of unique co-occurrences C is received from the spatial pooler 440. If each co-occurrence is split into K sub-occurrences, the connectivity matrix M is initialized to include (C×K) rows and (C×K) columns. In one embodiment, all entries in the matrix M are initially set to zero to represent that there is no connection between any sub-occurrences.

In one embodiment, the initialized variables include activity variable $\alpha_{0,i}$ for each sub-occurrence i (where $\forall i \in [1, C \times K]$). The activity variable $\alpha_{t,i}$ is proportional to the probability that co-occurrence i is active at time t given all previous co-occurrences are active from time T=0 to time T=t, given the connective relationships as represented by the connectivity matrix M. The activity variable $\alpha_{0,i}$ for each sub-occurrence i (where $\forall i \in [1, C \times K]$) is initialized to 1/S where S equals C×K. A connectivity constant C for adding connectivity value to all possible sub-occurrences may also be initialized to a specific value. In another embodiment, initialization of the activity variable $\alpha_{t,i}$ may be non-uniform to capture higher probability of starting in certain sub-occurrences.

Figures 10, 11:
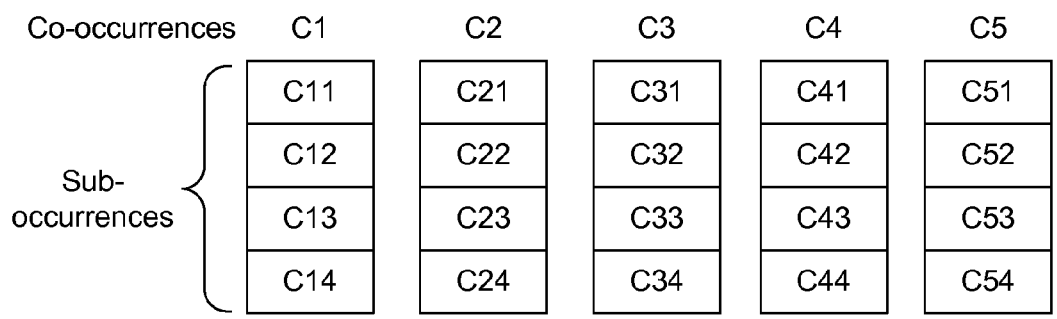
FIG. 10 is a diagram illustrating each co-occurrence in an input pattern split into four sub-occurrences, according to one embodiment of the present invention.
FIG. 11 is a connectivity matrix with four sub-occurrences allotted to one co-occurrence, according to one embodiment of the present invention.

FIG. 10 is a diagram illustrating co-occurrences C1 through C5 where each co-occurrence is split into four sub-occurrences, according to one embodiment of the present invention. The sub-occurrences C11, C12, C13 and C14 are split from the co-occurrence C1; the sub-occurrences C21, C22, C23 and C24 are split from the co-occurrence C2; the sub-occurrences C31, C32, C33 and C34 are split from the co-occurrence C3; the sub-occurrences C41, C42, C43 and C44 are split from the co-occurrence C4; and sub-occurrences C51, C52, C53 and C54 are split from the co-occurrence C5. The number of sub-occurrences is merely illustrative and a co-occurrence may be split into different numbers of sub-occurrences. Over-splitting the co-occurrences simply leads to more distinct sequences. However, such distinct sequences are likely to be classified to the same group during the partitioning process at the sequence grouper 840. Hence, other than requiring more memory and computational resources, increasing the number of sub-occurrences does not negatively affect the performance of the HTM network. Further, not all co-occurrences must be split into the same number of sub-occurrences. For example, one co-occurrence may be split into four sub-occurrences and another co-occurrence may be split into two sub-occurrences during the initialization process.

FIG. 11 is a connectivity matrix for representing the connective relationship between the sub-occurrences C11 through C54, according to one embodiment of the present invention. Because there are five co-occurrences and each co-occurrence has four sub-occurrences, the connectivity matrix of FIG. 11 includes twenty rows and twenty columns. As in the connectivity matrices of FIGS. 5A and 5B, the rows of the connectivity matrix in FIG. 11 represent outbound occurrences and the columns of connectivity matrix in FIG. 11 represent inbound occurrences. In one embodiment, all entries in the connectivity matrix of FIG. 11 are initially set to zero. As outputs from the spatial pooler 440 are received, the connectivity matrix is updated to reflect the temporal relationships between the sub-occurrences.

Referring back to FIG. 9, the window buffer 810 stores the probabilities of co-occurrences after initializing 902 the connectivity matrix M and other variables. Specifically, the probabilities for co-occurrences from time t to t+W (i.e., $e^-_t$, $e^-_{t+1}$, ..., $e^-_{t+W}$) are received 904 at the HOT pooler 800 where W represents the size of the buffer window for storing the probabilities of co-occurrences. The window buffer 810 stores 908 the probabilities for co-occurrences from time t+1 to t+W (i.e., $e^-_{t+1}$, $e^-_{t+2}$, ..., $e^-_{t+W}$) for reference by the connectivity matrix updater 820 while the probabilities of co-occurrences at time t (i.e., $e^-_t$) are provided to the connectivity matrix updater 820. When the sequence of co-occurrences is highly variable, it is generally advantageous to use a shorter buffer window. Conversely, when rapid processing of long sequences is needed, a longer window buffer is generally preferred. In one embodiment, if the number of remaining training co-occurrences is less than the size of the buffer windows, the buffer window is truncated to store a matching number of probabilities for the remaining training data.

Figure 12:
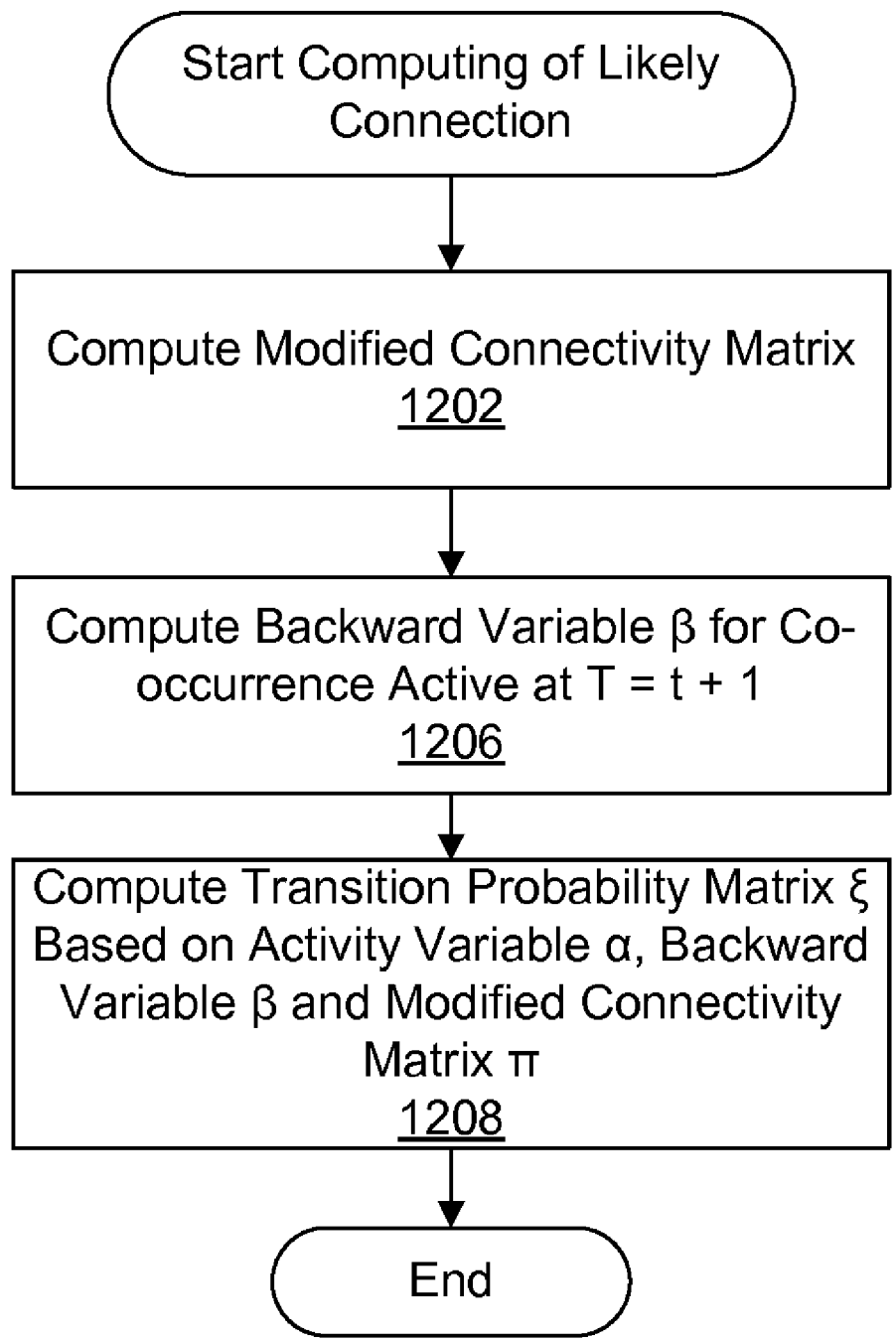
FIG. 12 is a flow chart illustrating a method for computing the most likely connection between sub-occurrences, according to one embodiment of the present invention.

Then the connectivity matrix updater 820 computes 912 the likelihood of sub-occurrences active at time T=t and at time T=t+1 for the sequence of co-occurrences in the spatial pooler 440. FIG. 12 is a process for computing likely connections from a sub-occurrence at time t to a sub-occurrence at time t+1, according to one embodiment of the present invention. In this embodiment, a modified connectivity matrix Π is computed 1202 from the connectivity matrix M. The connectivity matrix M includes a large number of zero entries meaning that transition from a sub-occurrence of the column to a sub-occurrence of the row was not previously observed. In the modified connectivity matrix Π, each entry is incremented by a small value to represent that there is a small possibility that connections exist between sub-occurrences even though such transitions were not previously observed. By computing the likelihood of the transition between sub-occurrences based on the modified connectivity matrix, a single simple procedure may be used to connect new sub-occurrences and strengthening existing connections. The smoothing reduces the number of parameters to control these processes. In another embodiment, the modified connectivity matrix Π is not used, and the following processes of computing backward variable and the probability matrix $\xi_t$ is based on the unmodified connectivity matrix M. Other rules may be also be used to decide whether to create a new connection or randomize creation of connections to increase the number of connections.

In one embodiment, the modified connectivity matrix Π is computed by the following equation:

$$\Pi = R_M \left( M + \frac{\epsilon}{S} 1_{S \times S} \right) \quad \text{equation (1)}$$

where $R_M$ is a normalizing vector, S represents the total number of sub-occurrences (equals C×K), $\epsilon$ is a connectivity constant, and $1_{S \times S}$ is an S×S matrix of ones. The connectivity constant $\epsilon$ represents the likelihood of allocating different sub-occurrences corresponding to the same co-occurrences to different temporal sequences. In general, higher connectivity constant C increases the likelihood of connecting co-occurrences in different sequences to an already allocated sub-occurrence whereas lower connectivity constant C increases the likelihood of allocating co-occurrences appearing different sequences to different sub-occurrences. The normalizing vector $R_M$ is defined as follows:

$$R_M = \quad \text{equation (2)}$$

$$\begin{pmatrix} \left(\epsilon + \sum_{j=1}^{S} M_{1,j}\right)^{-1} & 0 & 0 & \cdots & 0 \\ 0 & \left(\epsilon + \sum_{j=1}^{S} M_{2,j}\right)^{-1} & 0 & \cdots & 0 \\ \vdots & & & \ddots & \\ 0 & & \cdots & & \left(\epsilon + \sum_{j=1}^{S} M_{S,j}\right)^{-1} \end{pmatrix}$$

where $M_{i,j}$ represents a value at I column and j row of the connectivity matrix M. The normalize vector $R_M$ functions to make the rows of the modified connectivity matrix Π sum to one, allowing the modified connectivity matrix Π to be treated as a discrete conditional probability distribution. Other processes may be used to generate modified connectivity matrix to serve the same purpose. For example, the modified connectivity matrix Π' is obtained by adding different random values of small values to each entry of the connectivity matrix M.

Backward variable $\beta_{t+1,j}^{t+W}$ is then computed 1206. The backward variable $\beta_{t+1,j}^{t+W}$ represents the probability that evidence $e^-_{t+2}$ through $e^-_{t+W}$ are received from the spatial pooler 440 if the sub-occurrence j is active at time t+1. $\beta_{t+1,j}^{t+W}$ is calculated first by setting $\beta_{t+W,j}^{t+W}$ to 1/S and then computing back to $\beta_{t+1,j}^{t+W}$. For this purpose, $\tilde{\beta}_{t+W-w,i}^{t+W}$ is computed using the following equation:

$$\tilde{\beta}_{t+W-w}^{t+W} = \Pi(\beta_{t+W-w+1}^{t+W} \cdot e_{t+W-w+1}^-) \quad \text{equation (3)}$$

where w=1 to W, Π is a matrix-vector product, and the dot (·) represents element-wise multiplication of vectors. Then $\beta_{t+W-w,j}^{t+W}$ is computed using the following equation:

$$\beta_{t+W-w}^{t+W} = \tilde{\beta}_{t+W-w}^{t+W} / \sum_{j=1}^{S} \tilde{\beta}_{t+W-w,j}^{t+W} \quad \text{equation (4)}$$

By repeating equations (3) and (4) for increased w values, $\beta_{t+W-w,i}^{t+W}$ can be computed.

In one embodiment, the transition probability matrix $\xi_t$ is then computed 1208 to determine the likelihood of transitions between sub-occurrences. The transition probability matrix $\xi_t$ includes elements indicating the probability of transition from a sub-occurrence at time t to a sub-occurrence at time t+1. In order to obtain the transition probability matrix $\xi_t$, an intermediate matrix N is obtained by computing outer product of the activity variable $\alpha_t$ with the element-wise product $(\beta_{t+1,j}^{t+W} \cdot e^-_{t+1})$. The intermediate matrix N is a matrix of size S×S. The intermediate matrix N approximates the likelihood of receiving previous co-occurrences up to time t and the co-occurrences in the window buffer (occurrences at time t+1 through time t+W) if the sub-occurrence of its column was active at time t and sub-occurrence of its row was active at time t+1. The transition probability matrix $\xi_t$ is then computed by element-wise multiplying the intermediate matrix N by the modified connectivity matrix Π. The column of the highest valued entry in the transition probability matrix $\xi_t$ represents the most likely sub-occurrence at time t and the row of the highest valued entry in the transition probability matrix $\xi_t$ represents the most likely sub-occurrence at time t+1.

Referring back to FIG. 9, the connectivity matrix M is then updated 916 based on the transition probability matrix $\xi_t$. Specifically, the transition probability matrix $\xi_t$ is sparsified 1212 by leaving only a predetermined number of entries with the highest values while setting other entries to zeros. By sparsifying the transition probability matrix $\xi_t$, subsequent processing can be simplified as well as allowing easier interpretation of learned sub-occurrences and easier grouping of sub-occurrences due to the reduced connectivity. After sparsifying the transition probability matrix $\xi_t$ the transition probability matrix is resealed 1216 to a normalized transition probability matrix $\tilde{\xi}_t$ where the sum of all entries in the normalized transition probability matrix $\tilde{\xi}_t$ equals one. The updated connectivity matrix M is then computed by adding the normalized transition probability matrix $\tilde{\xi}_t$ to the previous connectivity matrix M.

The updated activity variable $\alpha_{t+1}$, is computed 918 based on the modified connectivity matrix Π. Specifically, the activity variable $\alpha_{t+1}$, is computed by the following equation:

$$\alpha_{t+1} = (\alpha' \Pi)' \cdot e_{t+1}^- \quad \text{equation (5)}$$

where the prime (') indicates transpose function, and the dot (·) indicates element-wise multiplication.

It is then determined 920 whether there are further training data to the HOT pooler 800. If there is an additional training data from the spatial pooler 440, the process proceeds to advance 924 the time t by incrementing the time. Then probabilities $e^-_{t+w}$, for co-occurrences at time t+w (with time t advanced) are received 928 at the window mapper 810. The stored probabilities in the window buffer 810 are then shifted 932 to store the newly received probabilities $e^-_{t+w}$. The co-occurrence $e^-_{t-1}$ is removed from the window buffer 810. Then the process returns to computing 912 the likelihood of sub-occurrences.

If it is determined 920 that no further training data are available, then the training of the signal pass HOT pooler 800 is terminated and the process ends. After all the training data are exhausted, the connectivity matrix M contains entries indicating connective strengths and temporal relationships between sub-occurrences. That is, each entry of $M_{i,j}$ indicates the strength of a connection from sub-occurrence i to sub-occurrence j.

In one embodiment, the HOT pooler 800 receives multiple rounds of probabilities $e^-_t$ 442 to refine the connectivity matrix M. In this embodiment, the activation variable $\alpha$ is reset for each rounds of probabilities $e^-_t$ 442 but the connectivity matrix M generated from the previous round(s) of probabilities $e^-_t$ 442 are retained. This embodiment allows even more repetitions of the same data to further differentiate connection strengths, simplifying the removal of relatively weak connections during grouping. Also, additional rounds may include new data, in which case the reset prevents creation of connections across disparate data sets. Additional rounds can also be run after modifying some of the sub-occurrences using forgetting or splitting. In this way, the learned model can be adapted to new data in an on-line manner.

Examples of Processing at Single-Round Higher-Order Temporal Pooler

The transition between the co-occurrences in the sequence may be one of the following cases: (i) the connectivity matrix does not include entries representing connections of sub-occurrences corresponding to a received sequence and there is at least one unallocated sub-occurrences available; (ii) the connectivity matrix already includes connections of sub-occurrences corresponding to the received sequence; (iii) the connectivity matrix includes connections of sub-occurrences representing a subset of the received sequence; and (iv) the connectivity matrix does not include any connections corresponding to the received sequence and there is no unallocated sub-occurrence remaining to represent the sequence. These cases are described below in detail with reference to FIGS. 13 through 16. In the purpose of following examples, assume the following for the sake of convenience: (i) four sub-occurrences are assigned to each co-occurrence, (ii) only winning occurrence is passed from the spatial pooler 440 to the HOT pooler 800 (i.e., only the most likely co-occurrence in evidence $e^-_t$ has a value of one while all the other co-occurrences are assigned value of zero), and (iii) the window size W is four.

Figures 13, 14:
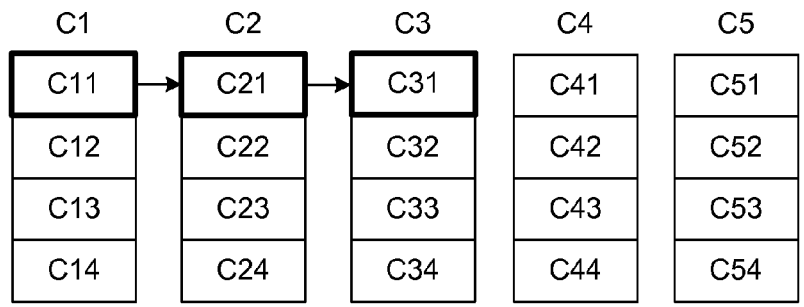
FIG. 13 is a state diagram illustrating connecting of sub-occurrences for the sequence of C1-C2-C3, according to one embodiment of the present invention.
FIG. 14 is a table illustrating updating of a connectivity matrix after receiving the sequence of C1-C2-C3, according to one embodiment of the present invention.

FIG. 13 illustrates an example of the first case where the connectivity matrix does not include entries representing connections of sub-occurrences corresponding to a received sequence and there is at least one unallocated sub-occurrences available, according to one embodiment. The sequence received at the HOT pooler 800 includes a co-occurrence C1 at time t, followed by a co-occurrence C2 at time t+1, and a co-occurrence C3 at time t+3. If it is assumed that the co-occurrences C1, C2 and C3 are received at the HOT pooler 800 for the first time, there should be four unassigned sub-occurrences remaining for each co-occurrence. The length of sequence C1-C2-C3 is three co-occurrences; and therefore, the buffer window is truncated to store two co-occurrences.

When the transition probability matrix $\xi_t$ is computed for transition between co-occurrences C1 and C2, the entries in the transition probability matrix $\xi_t$ representing transitions from one of sub-occurrences C11, C12, C13 and C14 to one of sub-occurrences C21, C22, C23 and C24 all have an equally high value, which means that all of these transitions are equally likely. In one embodiment, one of these entries in the transition probability matrix $\xi_t$ is selected and the value of this entry is set to one other entries are set to zero. This sparsifies the transition probability matrix $\xi_t$ and preserves remaining sub-occurrences for other sequences.

Similarly, when the transition probability matrix $\xi_{t+1}$ is computed, the entries representing transitions from one of sub-occurrences C21, C22, C23 and C24 to one of sub-occurrences C31, C32, C33 and C34 all have equally high values, which means that all of these transitions are equally likely. Entries in the transition probability matrix $\xi_{t+1}$ corresponding to one of these transitions are selected and set to one while other entries are set to zero. In the example of FIG. 13B, the transition from sub-occurrence C21 to sub-occurrence C31 is selected.

FIG. 14 is a table illustrating updating entries in the connectivity matrix after receiving the sequence of C1-C2-C3, according to one embodiment. The transition from the sub-occurrence C11 to sub-occurrence C21 and the transition from the sub-occurrence C21 to sub-occurrence C31 are represented by an entry 1310 and an entry 1320, respectively. After receiving the sequences of C1-C2-C3, each of the entries 1310 and 1320 is incremented by one to indicated strengthened connection between the co-occurrences C1, C2 and co-occurrences C2, C3.

Figure 15:
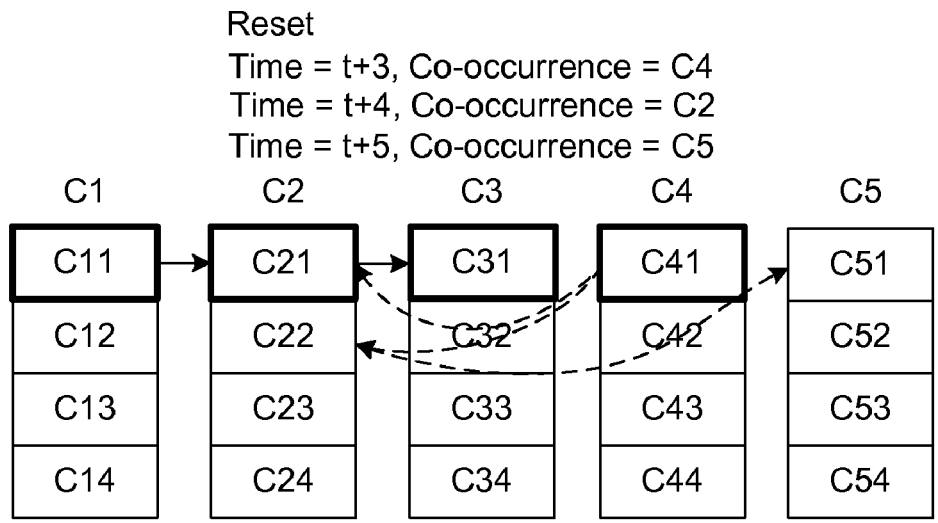
FIG. 15 is a state diagram illustrating a process of connecting sub-occurrences for the sequence of C4-C2, according to one embodiment of the present invention.

FIG. 15 illustrates an example where a sequence of C4-C2-C5 is received at the HOT pooler 800 as the winning occurrences, according to one embodiment. In this embodiment, the sequence received at the HOT pooler 800 includes a co-occurrence C4 at time t+3 followed by co-occurrences C2 at time t+4 and co-occurrence C5 at time t+5. Assume that the sequence of C1-C2-C3 as illustrated in FIG. 13 was previously received at times t through t+2. The sub-occurrence C21 is already allotted to represent the co-occurrence C2 in the sequence C1-C2-C3. Therefore, the HOT pooler 800 must determine whether to connect any one of sub-occurrence C41 through C44 to the sub-occurrence C21 (already allotted) or one of sub-occurrences C22 through C24 (not allotted). When the transition probability matrix $\xi_{t+3}$ is computed, the entries of the transition probability matrix $\xi_{t+3}$ corresponding to transition from any one of sub-occurrence C41 through C44 to any one of sub-occurrence C22 through C24 will have equally high values. The entry of the transition probability matrix $\xi_{t+3}$ representing transition from any one of sub-occurrence C41 to sub-occurrence C21 will have lower values because the co-occurrence C5 (not the co-occurrence C2) follows the co-occurrence C2. Therefore, one of the entries corresponding to a transition from any one of sub-occurrences C41 through C44 to sub-occurrences C22 through C24 is selected. The value in the selected entry is increased to one while values for other entries are set to zeroes. In the example of FIG. 15, a transition from sub-occurrence C41 to sub-occurrence C22 is selected.

In the second case where the connectivity matrix already includes connections corresponding to the received sequence, the connectivity matrix updater 820 increases counts in the entries corresponding to the connections between sub-occurrences representing the received sequence. For example, if another sequence of C1-C2-C3 is received, the counts in entries 1310 and 1320 are again incremented to indicate stronger connections between the co-occurrences.

In the third case where the connectivity matrix includes connections that represent a subset of the received sequence, either new connections may be created or preexisting connections may be strengthened. Whether to create new connections or to strengthen preexisting connections may be decided based on unallocated sub-occurrences remaining and the connectivity constant $\epsilon$.

Figure 16:
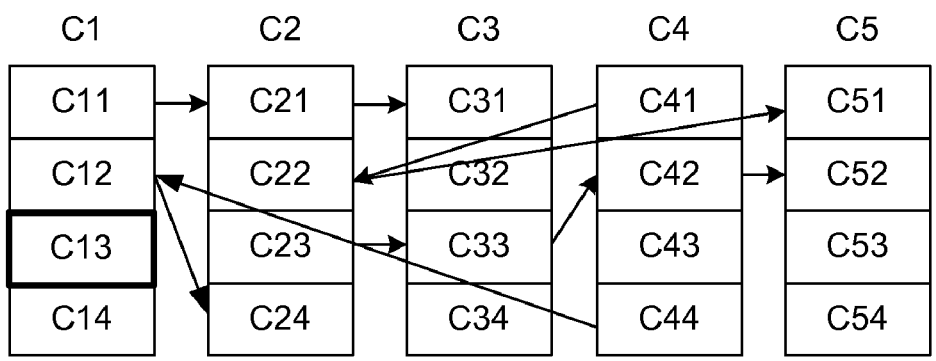
FIG. 16 is a state diagram illustrating a process of connecting sub-occurrences for the sequence of C1-C2-C3-C4-C5, according to one embodiment of the present invention.

In the fourth case where the connectivity matrix does not include any connections that correspond to the received sequence and there is no unallocated sub-occurrence remaining to represent the new sequence, an allocated sub-occurrence is selected for connection in a manner that least affects other important connections in the connectivity matrix. FIG. 16 illustrates receiving a new sequence of C1-C2-C3-C4-C5 after all the sub-occurrences corresponding to the co-occurrence C2 are allotted, according to one embodiment of the present invention. In order to determine which one of the sub-occurrence C21, C22, C23 or C24 are to be connected to sub-occurrence C13, the transition probability matrix $\xi_t$ is computed, as described above in detail with reference to FIG. 12. The row of the entry in the transition probability matrix $\xi_t$ with the highest value indicates which one of the sub-occurrences C21, C22, C23 and C24 is to be connected to sub-occurrence C13.

Alternative Embodiments

In one embodiment, the connectivity matrix M is updated as additional training patterns become available. After generating a connectivity matrix M based on a first set of training patterns, a second set of training patterns may be fed to the HTM network to update the connectivity matrix M. When training the HTM network with the second set of training patterns, it is advantageous to use the connectivity matrix generated by the first set of training patterns because previous connections established by the first set of training patterns may still be applicable. The activation variable a may be reset when training the HTM network with the second set of training patterns when there is unlikely to be any connections between the first set of training patterns and the second training patterns.

In one embodiment, a transition from one sub-occurrence to the same sub-occurrence is prevented. In cases where sequences can have very flexible timings, durations or speeds, it is undesirable to allow connections from a sub-occurrence to itself, or even to other sub-occurrences of the same occurrence. Such connections model the duration an occurrence is active for, and if this can change wildly then it is wasted modeling. To prevent the recursive connection, the term $$\left(M + \frac{\epsilon}{S} 1_{S \times S}\right)$$

is replaced with $$\left(M + \frac{\epsilon}{S-1}(1_{S \times S} - I).\right)$$

in equation (1) where I represents an identity matrix of size S×S. The replaced term prevents incrementing of values in diagonal entries (i=j) of the modified connectivity matrix, preventing any recursive connections. The remaining process associated with equations (2) through (5) remains unchanged.

In one embodiment, entries of the connectivity matrix are corrected if values of the entries drop to zero despite the presences of corresponding co-occurrences in the sequence of co-occurrences. The entries may drop to zero despite the presence of corresponding co-occurrences due to a loss of numerical precision or the constraints imposed on the learning. Without correcting such entries, correct connections may not be made. To rectify this problem, the connectivity matrix may be checked to determine if entries corresponding to a co-occurrence present in the sequence dropped to zero. The entries for some or all of such sub-occurrences may be increased to a threshold value to revive the connection.

In one embodiment, the input patterns to the HTM network include natural breaks. These breaks may be leveraged to increase likelihood of correctly learning the temporal relationship between the sub-occurrences. In order to take advantage of the breaks, the following modification is made to the process: (i) add a beginning sub-occurrence and an ending sub-occurrence, and do not connect the added sub-occurrences to any other sub-occurrences initially; (ii) change the initialization time of activity variable $\alpha$ at time 0 (before training stage) to time 1 and the activity variable of all other sub-occurrences to zero; (iii) truncate the training data at the break; (iv) append an input to this range of data that will activate only the end sub-occurrences ($e^-_{t,end}=1$, $e^-_{t,\ldots}=0$); (v) perform training based on the truncated data set; and (vi) repeat the process for the remaining sets of data truncated by the breaks.

In one embodiment, the temporal pooler updates the temporal statistics data while performing the inference. The data for inference received during the inference stage may be processed at the HTM network so that the temporal pooler updates the connectivity matrix M after the inference data is received at the HTM network. The temporal pooler may then group sequences based on the updated connectivity matrix to update the temporal statistics data.

In one embodiment, the entries in the connectivity matrix corresponding to sub-occurrences that do not appear frequently during the training stage are reduced or set to zero. For example, the entries may be set to zero when the sub-occurrences corresponding to the entries are not active for a predetermined amount of time. Alternatively, the entries may be gradually decreased as the sub-occurrence is not active in a next sequence. By setting the values or reducing the values of the entries, unlearning or forgetting of temporal sequences may be implemented. Similar mechanism may be used for input patterns received during the inference stage. If a co-occurrence or sub-occurrence is not activated for a predetermined amount of time, the connectivity matrix may be updated to reduce corresponding entries or set the values to zero. The updated connectivity matrix may then be processed to group or partition sequences and the connections thereof. This embodiment is advantageous to accommodate cases where the input data change and the Markov model created from previous input data becomes inapplicable.

In one embodiment, two or more connectivity matrices are generated and maintained by the HOT temporal pooler. Each connectivity matrix may represent transition for different time increments. For example, one connectivity matrix may tally transition counts for every time steps while another connectivity matrix may tally transition counts for ever other transitions. Different groups of co-occurrences may be generated from each connectivity matrix. Alternatively, the transition counts from multiple connectivity matrices may be combined to generate groups of co-occurrences.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A node in a computer-implemented Temporal Memory network, the node comprising:
   a processor;
   a temporal pooler configured to generate temporal statistics data representing a higher than first order Markov chain of temporal sequences of the spatial co-occurrences based on temporal relationships of the spatial co-occurrences of first input patterns in the training stage; and
   an inference engine configured to generate an output based on the temporal statistics data responsive to receiving a sequence of spatial co-occurrence information about second input patterns in an inference stage subsequent to the training stage, the output representing probabilities of the sequence of the spatial co-occurrence information corresponding to temporal sequences of the temporal statistics data.

2. The node of claim 1, wherein the temporal pooler is further configured to split a spatial co-occurrence into a plurality of sub-occurrences, each sub-occurrence assigned to represent the spatial co-occurrence in a different temporal sequence.

3. The node of claim 2, wherein the temporal pooler is further configured to store temporal relationships of the sub-occurrences in a connectivity matrix, each entry in the connectivity matrix representing frequency or transition counts from a first sub-occurrence to a second sub-occurrence, the first sub-occurrence split from a first spatial co-occurrence, and the second sub-occurrence split from a second spatial co-occurrence.

4. The node of claim 2, wherein the temporal pooler is configured to generate the temporal statistics data by receiving a single-round of the sequence of the spatial co-occurrence information.

5. The node of claim 2, wherein the temporal pooler comprises:
   a window buffer for storing the sequence of the spatial co-occurrence information for a predetermined time period;
   a connectivity matrix updater configured to determine transition from a first sub-occurrence at a first time to a second sub-occurrence at a second time subsequent to the first time based on the spatial co-occurrence information at a third time subsequent to the second time received from the window buffer;
   a connectivity matrix store configured to store counts or frequency of the transition from the first occurrence to the second sub-occurrence; and
   a sequence grouper configured to group sequences of co-occurrences based on the connectivity matrix.

6. The node of claim 5, wherein the connectivity matrix updater is configured to determine the transition based on a modified connectivity matrix generated by adding values to entries of the connectivity matrix to represent added likelihood of transitions between sub-occurrences not appearing in the connectivity matrix.

7. The node of claim 5, wherein the connectivity matrix updater is configured to determine the transition based on an activity variable representing probability of receiving a co-occurrence at the first time and previous co-occurrences before the first time according to the temporal relationships represented by the connectivity matrix.

8. The node of claim 1, wherein the temporal pooler is configured to generate the temporal statistics data by receiving a plurality rounds of the sequence of the spatial co-occurrence information.

9. The node of claim 7, wherein the temporal pooler comprises:
   a mapper configured to map spatial co-occurrences of the first input patterns at a second time to sub-occurrences based on spatial co-occurrences of the first input patterns at a first time preceding the second time;
   a connectivity matrix counter for adding counts to a connectivity matrix, the connectivity matrix configured to store counts or frequency of the transition from a first co-occurrence or a first sub-occurrence to a second co-occurrence or a second sub-occurrence;
   a splitter configured to expand the connectivity matrix counter by selectively splitting a co-occurrence in the connectivity matrix, the splitter configured to update the mapper based on the splitting of the co-occurrence; and
   a sequence grouper configured to group sequences of co-occurrences based on the connectivity matrix.

10. A computer-implemented method of generating an output in a node of a Temporal Memory network, comprising:
    generating information about spatial co-occurrences of first input patterns received by the node based on spatial similarity of the first input patterns in a training stage;
    generating temporal statistics data representing a higher than first order Markov chain of temporal sequences of the spatial co-occurrences based on temporal relationships of the spatial co-occurrences in the training stage; and
    generating the output based on the temporal statistics data responsive to receiving a sequence of spatial co-occurrence information about second input patterns, the output representing probabilities of the sequence of the spatial co-occurrence information corresponding to temporal sequences of the temporal statistics data in an inference stage subsequent to the training stage.

11. The method of claim 10, further comprising splitting a spatial co-occurrence into a plurality of sub-occurrences, each sub-occurrence assigned to represent the spatial co-occurrence in a different temporal sequence of the higher-order Markov chain.

12. The method of claim 11, further comprising storing temporal relationships of the sub-occurrences in a connectivity matrix, each entry in the connectivity matrix representing frequency or transition counts from a first sub-occurrence to a second sub-occurrence, the first sub-occurrence split from a first spatial co-occurrence, and the second sub-occurrence split from a second spatial co-occurrence.

13. The method of claim 11, further comprising generating the temporal statistics data by receiving a single round of the sequence of the spatial co-occurrence information.

14. The method of claim 11, further comprising:
    storing the sequence of the spatial co-occurrence information for a predetermined time period;
    determining transition from a first sub-occurrence at a first time to a second sub-occurrence at a second time subsequent to the first time based on the spatial co-occurrence information at a third time subsequent to the second time received from the window buffer;
    storing configured to store counts or frequency of the transition from the first occurrence to the second sub-occurrence; and
    grouping sequences of co-occurrences based on the connectivity matrix.

15. The method of claim 14, wherein determining the transition comprises:
    generating a modified connectivity matrix by adding values to entries of the connectivity matrix to represent added likelihood of transitions between sub-occurrences not appearing in the connectivity matrix;
    computing an activity variable representing probability of receiving a co-occurrence at the first time and previous co-occurrences before the first time according to the temporal relationships represented by the connectivity matrix; and
    determining the transition based on the modified connectivity matrix and the activity variable.

16. The method of claim 10, wherein the temporal statistics data is generated by receiving a plurality rounds of probabilities of co-occurrences.

17. The method of claim 16, further comprising:
    mapping spatial co-occurrences of the first input patterns at a second time to sub-occurrences based on spatial co-occurrences of the first input patterns at a first time preceding the second time;
    adding counts to a connectivity matrix, the connectivity matrix configured to store counts or frequency of the transition from a first co-occurrence or a first sub-occurrence to a second co-occurrence or a second sub-occurrence;
    expanding the connectivity matrix counter by selectively splitting a co-occurrence in the connectivity matrix, the splitter configured to update the mapper based on the splitting of the co-occurrence; and
    grouping sequences of co-occurrences based on the connectivity matrix.

18. A non-transitory computer program storage medium storing computer instructions to operate a Temporal Memory network on a computer, the computer instructions when executed cause a processor in the computer to:
    generate information about spatial co-occurrences of first input patterns received by a node in the Temporal Memory system based on spatial similarity of the first input patterns in a training stage;
    generate temporal statistics data representing a higher than first order Markov chain of temporal sequences of the spatial co-occurrences based on temporal relationships of the spatial co-occurrences in the training stage; and
    generate an output based on the temporal statistics data responsive to receiving a sequence of spatial co-occurrence information about second input patterns, the output representing probabilities of the sequence of the spatial co-occurrence information corresponding to temporal sequences of the temporal statistics data in an inference stage subsequent to the training stage.

19. The computer program storage medium of claim 18, further comprising instructions to split a spatial co-occurrence into a plurality of sub-occurrences, each sub-occurrence assigned to represent the spatial co-occurrence in a different temporal sequence of the higher-order Markov chain.

20. The computer program storage medium of claim 18, further comprising instructions to:
   store the sequence of the spatial co-occurrence information for a predetermined time period;
   determine transition from a first sub-occurrence at a first time to a second sub-occurrence at a second time subsequent to the first time based on the spatial co-occurrence information at a third time subsequent to the second time received from the window buffer;
   store configured to store counts or frequency of the transition from the first occurrence to the second sub-occurrence; and
   group sequences of co-occurrences based on the connectivity matrix.

* * * * *